United States Patent
HomChaudhuri et al.

(10) Patent No.: US 9,907,023 B1
(45) Date of Patent: Feb. 27, 2018

(54) POWER MANAGEMENT DURING VOICE CALLS

(71) Applicant: QUALCOMM Incorporated, San Diego, CA (US)

(72) Inventors: Sandip HomChaudhuri, San Jose, CA (US); Pradeep Kumar Yenganti, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/339,115

(22) Filed: Oct. 31, 2016

(51) Int. Cl.
H04W 52/02 (2009.01)
H04W 88/08 (2009.01)
H04W 88/02 (2009.01)

(52) U.S. Cl.
CPC ... *H04W 52/0261* (2013.01); *H04W 52/0251* (2013.01); *H04W 88/02* (2013.01); *H04W 88/08* (2013.01)

(58) Field of Classification Search
CPC . H04W 52/00–52/0296; H04W 88/02; H04W 88/08
See application file for complete search history.

(56) References Cited

U.S. PATENT DOCUMENTS

| | | | |
|---|---|---|---|
| 8,090,371 B2 | 1/2012 | Gallagher et al. | |
| 8,644,771 B1 | 2/2014 | Delker et al. | |
| 9,264,994 B2 | 2/2016 | Lee et al. | |
| 9,344,963 B2 | 5/2016 | Seok | |
| 2006/0187876 A1* | 8/2006 | Schmidl | H04B 1/1615 370/328 |
| 2007/0286222 A1 | 12/2007 | Balasubramanian | |
| 2015/0098374 A1 | 4/2015 | Homchaudhuri et al. | |
| 2016/0119881 A1 | 4/2016 | Merlin et al. | |

OTHER PUBLICATIONS

International Search Report and Written Opinion—PCT/US2017/054403—ISA/EPO—Dec. 1, 2017.
Tsao S-L., et al., "Energy Conserving Packet Transmission Schemes for Video and Voice Over WLAN", Consumer Communications and Networking Conference CCNC 2006, 3rd IEEE Las Vegas, NV, USA, Piscataway, NJ, USA, IEEE, vol. 2, Jan. 8, 2006, pp. 758-762, XP010893278, DOI: 10.1109/CCNC.2006.1593141, ISBN: 978-1-4244-0085-0.
Tsao S-L., "Research Challenges and Perspectives of Voice Over Wireless LAN", Emerging Information Technology Conference, NTY, Taipei, Taiwan, Piscataway, NJ, USA, IEEE. Aug. 15, 2005, pp. 115-118, XP010856458, DOI: 10.11 09/EITC.2005.1544362, ISBN: 978-0-7803-9328-8.

* cited by examiner

*Primary Examiner* — Raymond Dean
(74) *Attorney, Agent, or Firm* — Holland & Hart LLP

(57) ABSTRACT

Methods, systems, and devices for wireless communication are described. A station (STA) capable of supporting multiple power modes may monitor traffic on a channel. The STA may, based on the monitoring, detect an ongoing voice call between the STA and an access point (AP). Upon detection of the ongoing voice call, the STA may switch power modes from a power mode that does not support power collapse to a power mode that does support power collapse. The STA may also prompt the AP to send a downlink voice packet, if available. After a downlink transmission opportunity corresponding to the prompt occurs, the STA may enter power collapse. The STA may remain in power collapse until a subsequent uplink transmission opportunity occurs.

30 Claims, 16 Drawing Sheets

POWER MANAGEMENT DURING VOICE CALLS

BACKGROUND

The present disclosure relates generally to wireless communications, and more specifically to power management during voice calls.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., IEEE 802.11) network may include an access point (AP) that may communicate with one or more stations (STAs) or mobile devices. The AP may be coupled to a network, such as the Internet, and may enable a mobile device to communicate via the network (or communicate with other devices coupled to the access point).

A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP. A STA may communicate with an AP while in an active power mode and may conserve power in between communications by entering a sleep mode. In some cases, a STA may delay transitioning into a sleep mode after transmission or reception of a packet in case a subsequent packet is to be sent or received. For example, the STA may wait for an inactivity timeout (ITO) to expire before entering the sleep mode.

A STA may use an ITO regardless of the type of traffic the STA is transmitting or receiving. But use of ITO may keep a STA in active mode longer than necessary for some types of traffic. For example, for certain types of traffic, a STA may consume power to remain in active mode in between periodically-scheduled packets, when packets are generally not sent for that type of traffic between the periodically-scheduled packets. Consumption of power while in active mode may reduce the battery life of the STA and negatively impact performance of the STA.

SUMMARY

The described features generally relate to one or more improved systems, methods, and/or apparatuses for power management in wireless devices. More specifically, the described features relate to a wireless device switching between power modes based on the traffic type and/or periodicity of a communication. For example, a wireless device may detect that it is involved in an ongoing voice call (e.g., using Voice-over Wi-Fi (VoWi-Fi)) by identifying a periodicity associated with packets of the voice call. The wireless device may switch power modes upon detection of the voice call, for instance from a power mode that does not support power collapse (e.g., does not support a sleep mode) to a power mode that does support power collapse. While in the power mode that supports power collapse, the wireless device may poll an access point (AP) for downlink packets. By switching to the power mode that supports power collapse, the wireless device can enter power collapse after a downlink transmission opportunity associated with a poll rather than waiting for an inactivity timeout (ITO). The wireless device may intermittently wake up from power collapse (e.g., in the mode that supports power collapse) to send or receive packets over the wireless channel.

An apparatus for wireless communications is described. The apparatus may include a memory that stores instructions and a processor coupled with the memory. The processor and memory may be configured to detect, while in a first power mode, an ongoing voice call over a channel based at least in part on a periodicity of downlink or uplink packets. The processor and memory may be configured to switch to a second power mode based at least in part on the detection of the ongoing voice call and continue the voice call over the channel while in the second power mode.

A method of wireless communication at a wireless device is described. The method may include detecting, while in a first power mode, an ongoing voice call over a channel based at least in part on a periodicity of downlink or uplink packets. The method may include switching to a second power mode based at least in part on the detection of the ongoing voice call and continuing the voice call over the channel while in the second power mode.

A further apparatus for wireless communications is described. The apparatus may include means for detecting, while in a first power mode, an ongoing voice call over a channel based at least in part on a periodicity of downlink or uplink packets. The apparatus may include means for switching to a second power mode based at least in part on the detection of the ongoing voice call and means for continuing the voice call over the channel while in the second power mode.

A non-transitory computer-readable medium for wireless communications is described. The non-transitory computer-readable medium may store code comprising instructions executable to detect, while in a first power mode, an ongoing voice call over a channel based at least in part on a periodicity of downlink or uplink packets. The non-transitory computer-readable medium may store code comprising instructions executable to switch to a second power mode based at least in part on the detection of the ongoing voice call and continue the voice call over the channel while in the second power mode.

In some examples of the method, apparatus, or non-transitory computer-readable medium described above, continuing the voice call over the channel includes transmitting a speculative power-save poll (PS-Poll) over the channel based at least in part on switching to the second power mode. Some examples of the method, apparatus, or non-transitory computer-readable medium described above may further include processes, features, means, or instructions for determining a periodicity of uplink packets associated with the ongoing voice call, wherein the speculative PS-Poll is based at least in part on the periodicity of the uplink packets. In some examples, the speculative PS-Poll is transmitted independent of a downlink beacon traffic indication map (TIM). Some examples of the method, apparatus, or non-transitory computer-readable medium described above may further include processes, features, means, or instructions for entering a sleep mode after a downlink transmission opportunity corresponding to the speculative PS-Poll.

Some examples of the method, apparatus, or non-transitory computer-readable medium described above may further include processes, features, means, or instructions for entering a sleep mode based on a detection that the voice call has ended and transitioning from the sleep mode to the first power mode upon leaving the sleep mode. Some examples of the method, apparatus, or non-transitory computer-readable medium described above may further include processes, features, means, or instructions for determining that a predetermined threshold number of consecutive PS-Polls have failed to result in downlink transmissions of data for the station. Some examples may include decreasing a rate at which speculative PS-Polls are sent based at least in part on the determination that the predetermined threshold number of consecutive PS-Polls have failed to result in downlink transmissions of data for the station. Some examples of the method, apparatus, or non-transitory computer-readable medium described above may further include processes, features, means, or instructions for receiving, in response to the speculative PS-Poll, a downlink frame comprising an indication that user datagram protocol (UDP) traffic is pending for the wireless device and switching to the first power mode based at least in part on the indication. Some examples include receiving the UDP traffic while in the first power mode and switching to the second power mode when the channel is free of UDP traffic for a predetermined threshold of time.

In some examples of the method, apparatus, or non-transitory computer-readable medium described above, the first power mode prohibits entry into a sleep mode and the second power mode facilitates entry into the sleep mode. In some examples, the apparatus is a wireless communication terminal and further comprises an antenna and a transceiver.

DETAILED DESCRIPTION

Figure 1:
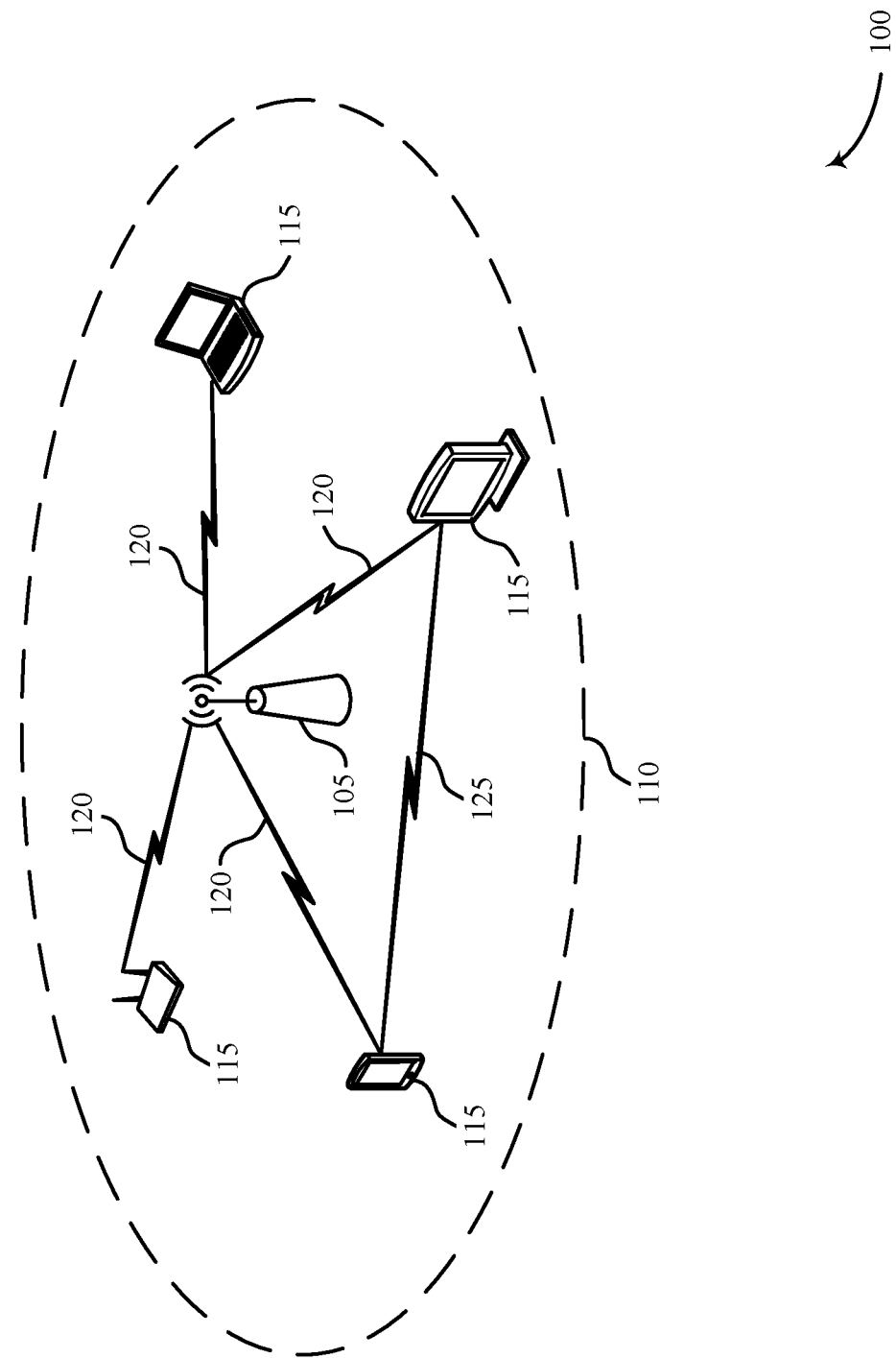
FIG. 1 illustrates a wireless communications system that supports power management during voice calls in accordance with aspects of the present disclosure.

The described features generally relate to improved power saving for a wireless device (e.g., a station (STA)) that is participating in a voice call. The STA may reduce power consumption by detecting a periodicity in downlink and/or uplink packets and by selectively entering different power modes based on the periodicity. For example, the STA may detect that voice call packets sent over a channel are sent with a particular periodicity and adjust its power mode so that it is capable of quickly entering sleep a mode in between traffic activity on the channel.

In some examples, a STA may communicate with an access point (AP) over unlicensed spectrum. For example, the STA may participate in a voice call with the AP using Voice-over Wi-Fi (VoWi-Fi).

In some cases, the AP may buffer packets for the STA until the STA sends a poll to the AP indicating that the STA is ready to receive the packets. The STA may be capable of operating in various power modes which consume varying amounts of power and which support different transmission schemes. For example, a STA may operate in a first power mode that supports the reception of multiple packets in response to a single poll sent to an AP. The first power mode may consume comparatively more power than a second power mode that supports the reception of a single packet in response to a poll. Additionally, the first power mode may prohibit entry into power collapse (e.g., a sleep mode) and the second power mode may facilitate entry into power collapse. A STA that is capable of receiving or transmitting packets may be referred to herein as being in active mode. Thus, a STA may be in active mode in either one of the first or second power modes and the STA may enter a sleep mode from the second power mode.

A STA may communicate while in the first power mode (e.g., to take advantage of the high downlink data rate supported by the first power mode) and reserve the second power mode for transitioning to sleep mode. For example, in between transmitting or receiving packets in the first power mode the STA may switch to the second power mode so that the STA can enter sleep mode, thereby conserving power. In some cases, the STA may wait for an inactivity timeout (ITO) after communication of a packet and before switching to the second power mode. For instance, the STA may wait to see if a packet is communicated during the ITO and, if no packet is received, the STA may enter sleep mode. But if the ITO is not set to be an appropriate value, the STA may miss opportunities for entering the sleep mode or may be asleep when incoming traffic arrives. For example, if the ITO is too short, a STA may prematurely enter the sleep mode after reception of a packet, missing a subsequent packet. In such a scenario, the AP involved in the voice call may buffer voice call packets until the STA awakes, which can introduce latency and jitter into the communications. Alternatively, if the ITO is too long, the STA may delay entering the sleep mode and in doing so consume excess power or, in some cases, miss the opportunity to enter a sleep mode altogether where the ITO length extends to the next voice call packet.

In some cases, a STA may use ITO regardless of the type of communication in which it is involved. For example, the STA may use ITO during a voice call in which voice packets are sent according to a periodic schedule. In such cases, the STA communicates exclusively in the first power mode and transition (e.g., after the ITO) to the second power mode in order to enter sleep mode. Thus, the STA transitions between power modes each time it enters sleep mode. Transitioning between power mode and waiting for the ITO delays entrance into sleep mode, which may cause the STA to consume excessive power.

According to the techniques described herein, a STA may recognize the type of communication in which it is participating and adjust its power mode to accommodate the periodicity of the communication type. For instance, the STA may determine from the periodicity of sent or received packets that a voice call is ongoing between the STA and an associated AP. Upon detection of the voice call, the STA may switch from communicating in the first power mode to communicating in the second power mode. Rather than waiting for ITO, the STA may enter the sleep mode after each downlink transmission opportunity corresponding to a poll from the STA. Thus, the STA may avoid delays arising from switching between the first power mode to the second power mode each time it transitions into the sleep mode. The STA may continue to operate in the second power mode until the voice call is concluded or until non-voice traffic is detected for the STA. If non-voice traffic is detected for the STA, the STA may temporarily re-enter the first power mode. When the channel becomes free of the non-voice traffic, the STA may switch back to the second power mode.

FIG. 1 illustrates a wireless communications system 100 configured in accordance with various aspects of the present disclosure. The wireless communications system 100 may be an example of a wireless local area network (WLAN) (also known as a Wi-Fi network, such as 802.11ax) and may include an AP 105 and multiple associated STAs 115. In some examples, devices in wireless communications system 100 may communicate over unlicensed spectrum, which may be a portion of spectrum that includes frequency bands traditionally used by Wi-Fi technology, such as the 5 GHz band, the 2.4 GHz band, the 60 GHz band, the 3.6 GHz band, and/or the 900 MHz band. The unlicensed spectrum may also include other frequency bands. In other examples, the techniques described herein may be applicable to other spectrum types, including contention-based mediums such as shared spectrum (e.g., where the spectrum is licensed to more than one operator or user) and mixed-use spectrum (e.g., including both licensed and unlicensed operators or users).

The STAs 115 may represent devices such as mobile stations, wireless communication terminals, phones, personal digital assistant (PDAs), other handheld devices, netbooks, notebook computers, tablet computers, laptops, display devices (e.g., TVs, computer monitors, etc.), printers, etc. The AP 105 and the associated STAs 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the wireless communications system 100. An extended network station associated with the wireless communications system 100 may be connected to a wired or wireless distribution system that may allow multiple APs 105 to be connected in an ESS. The STAs 115 may support various power modes for operation and communication. The power modes may consume different amounts of power and facilitate different techniques for communication. As described herein, a STA 115 may autonomously modify its power mode to reduce power consumption during communications that have a pattern, such as voice calls.

In some cases, a STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some cases, the coverage area 110 of an AP 105 may be divided into sectors. The wireless communications system 100 may include APs 105 of different types (e.g., metropolitan area, home network, etc.), with varying and overlapping coverage areas 110. An AP 105 may communicate with a STA 115 via a communication link 120. Two STAs 115 may also communicate directly via a direct wireless link 125 regardless of whether both STAs 115 are in the same coverage area 110. Examples of direct wireless links 125 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention-based environment (e.g., CSMA/CA) because the STAs 115 may not refrain from transmitting on top of each other. A STA 115 whose transmissions are not identifiable, but that is within the same coverage area 110 may be known as a hidden node. CSMA/CA may be supplemented by the exchange of an RTS packet transmitted by a sending STA 115 (or AP 105) and a CTS packet transmitted by the receiving STA 115 (or AP 105). This may alert other devices within range of the sender and receiver not to transmit for the duration of the primary transmission. Thus, RTS/CTS may help mitigate a hidden node problem.

An AP 105 may communicate with a STA 115 via uplink (UL) and downlink (DL). Uplink transmissions may refer to transmissions from the STA 115 to the AP 105 and downlink transmissions may refer to transmissions from the AP 105 to the STA 115. A number of communication techniques may be used for downlink and uplink transmissions. For example, a wireless device (e.g., an AP 105) may implement beamforming in which the energy of a transmission is focused in a particular direction (e.g., towards a STA 115, or a set of STAs 115). In some cases, single-input-single-output (SISO) techniques may be used for communications between an AP 105 and STA 115 in which both the AP 105 and the STA 115 use a single antenna. In other cases, multiple-input-multiple-output (MIMO) techniques may be used for when the AP 105 and/or STA 115 involved in a communication include multiple antennas.

In some cases, uplink and/or downlink multi-user MIMO (MU-MIMO) may be used. For example, uplink/downlink single-user MIMO (SU-MIMO) may be used in which multiple streams of data are simultaneously communicated (e.g., from an AP 105 to a STA 115) using multiple antennas and beamforming technology. In MU-MIMO, for example downlink MU-MIMO, an AP 105 may simultaneously send multiple streams to multiple STAs 115 by taking advantage of spatial diversity in transmission resources and multiple antennas.

In some cases, a STA 115 may conserve power by shutting down its transmit path in between transmissions. A STA 115 can further save power by entering a power save mode in which the STA 115 shuts down its receive path. The STA 115 can inform an AP 105 of the amount of time the STA 115 will be in power save mode by sending an indication to the AP 105 (e.g., by sending a null packet with the Power Management bit set). Upon reception of the indication, the AP 105 may store packets that addressed to the STA 115. In some cases, the AP 105 may send a traffic indication map (TIM) in a beacon that informs the STA 115 of the data that is buffered at the AP 105. The STA 115 may intermittently wake up (e.g., according to Listen Intervals) to check for and/or receive TIMs. In response to a TIM, the STA 115 may send a Power-Save Poll (PS-Poll) to the AP indicating that the STA 115 is ready to receive the buffered data. The AP 105 may send a downlink packet to the STA 115 in response to each PS-Poll. A STA 115 may exit power save mode by sending an indication to the AP 105 (e.g., by transmitting a null packet to the AP 105 with the Power Management bit cleared). In some cases, the STA 115 may increase the rate that downlink data is received by entering a power mode that supports reception of multiple queued downlink packets at the discretion of the AP 105, as opposed to one downlink packet in response to a PS-Poll. Thus, depending on the power mode of the STA 115, the AP 105 may send multiple packets to the STA 115 or a single packet.

As described herein, a STA 115 may, in some cases, implement speculative PS-Polls. A speculative PS-Poll may be a PS-Poll that is sent irrespective or independent of a TIM. For example, a STA 115 may transmit a speculative PS-Poll independent of reception of a TIM that indicates that the STA 115 has data waiting at an AP. Thus, a STA 115 may attempt to retrieve packets blindly (e.g., without confirmation that there are packets to be retrieved). In some examples, a STA 115 may schedule speculative PS-Polls based on the periodicity of uplink packets (e.g., uplink voice packets). The type of PS-Poll (e.g., speculative versus non-speculative) used by a STA 115 may vary with or be based on the power mode of the STA 115. For instance, a STA 115 may transmit non-speculative PS-Polls (e.g., those that are in response to a TIM) in a first power mode and may transmit speculative PS-Polls in a second power mode.

As described above, a STA 115 may support operation in various power modes (PMs). For example, a STA 115 may operate in various power modes which consume different amounts of power, enable different communication techniques, and define when the STA 115 can enter a power collapse mode (e.g., a sleep mode). A STA 115 operating according to a first power mode, which may be referred to herein as PM0 (or PM=0), may be prohibited from entering a sleep mode, while a STA 115 operating according to a second power mode, which may be referred to herein as PM1 (or PM=1), may enter power collapse given certain conditions (e.g., after each packet transmission/reception). A STA 115 operating in PM0 may consume more power than a STA 115 operating in PM1. Also, a STA 115 operating in PM0 may be available to receive multiple packets in succession from an AP 105, while a STA 115 operating in PM1 may receive packets one at a time from an AP in response to speculative PS-Polls.

According to the techniques described herein, a STA 115 that is in the process of communicating (e.g., with an AP 105) may switch between power modes based on a pattern of the communication or a type of the communication. For example, a STA 115 may detect that it is participating in a voice call that has a periodicity associated with packets sent over a channel. Upon detection of the voice call, the STA 115 may switch from a power mode that does not support power collapse (e.g., PM0) to a power mode that does support power collapse (e.g., PM1). The STA 115 may also switch from sending non-speculative PS-Polls to sending speculative PS-Polls. After the downlink opportunity associated with each speculative PS-Poll, the STA 115 may enter power collapse. The STA 115 may wake up from sleep in order to transmit over the channel.

Figure 2:
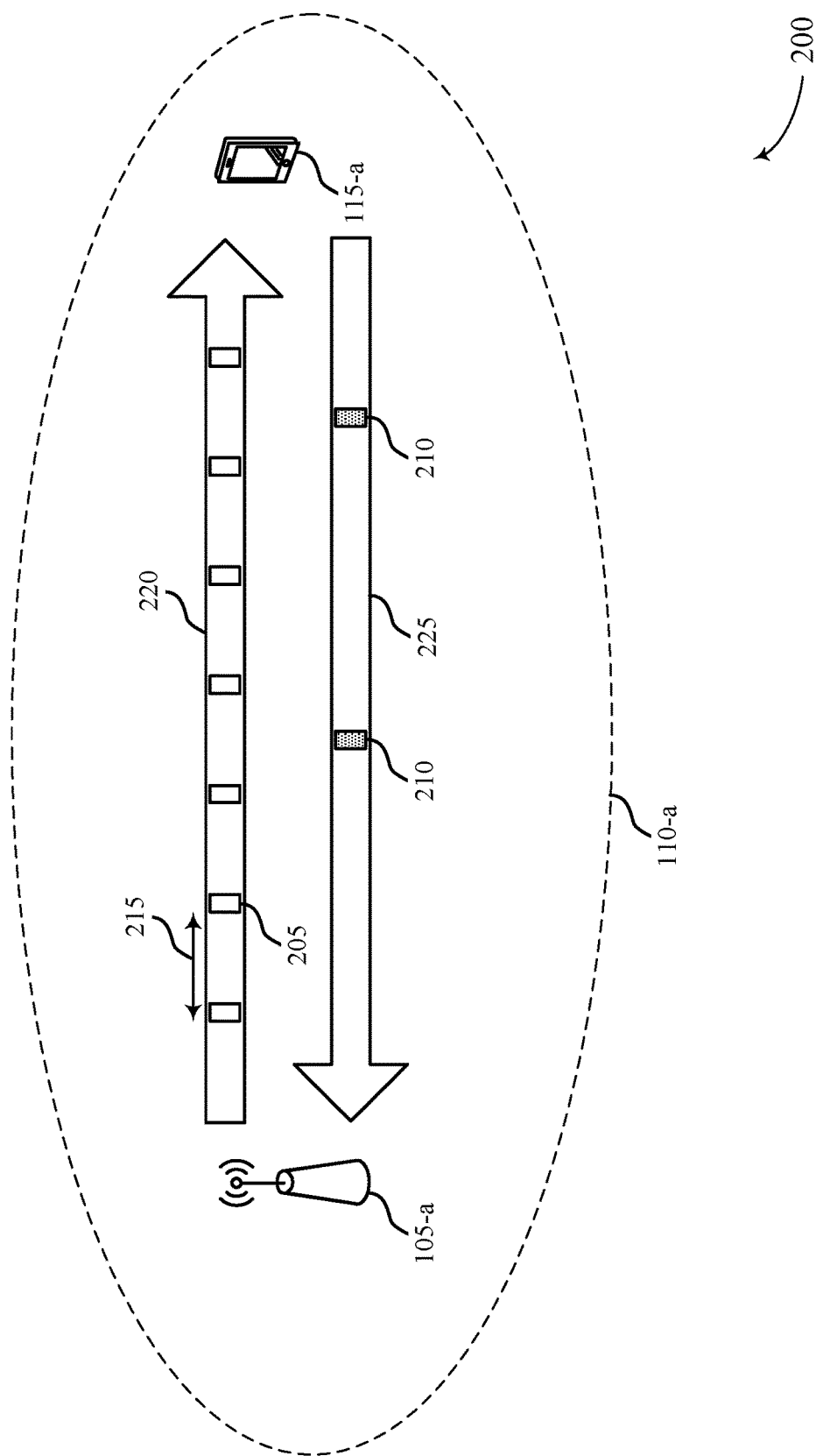
FIG. 2 illustrates an example of a wireless communications system that supports power management during voice calls in accordance with aspects of the present disclosure.

FIG. 2 illustrates an example of a wireless communications system 200 for power management during voice calls in accordance with various aspects of the present disclosure. Wireless communications system 200 includes an AP 105-*a* and STA 115-*a*, which may be examples of the corresponding devices described with reference to FIG. 1. AP 105-*a* may communicate with wireless devices inside coverage area 110-*a*. For example, AP 105-*a* may send packets to STA 115-*a* over a channel (e.g., a radio frequency spectrum band, such as an unlicensed radio frequency spectrum band) via downlink 220 and STA 115-*a* may send packets to AP 105-*a* over the channel via uplink 225. STA 115-*a* may be capable of transitioning between various power modes (e.g., PM0, PM1, a sleep mode, etc.). According to the techniques described herein, STA 115-*a* may switch between power modes based on the detection of a voice call.

AP 105-*a* and STA 115-*a* may participate in voice calls via VoWi-Fi (e.g., over one or more unlicensed or shared radio frequency spectrum bands). For example, AP 105-*a* may send downlink voice packets 205 to STA 115-*a* and STA 115-*a* may send uplink voice packets to AP 105-*a*. VoWi-Fi traffic may be sent according to a periodic schedule. For example, AP 105-*a* may transmit downlink voice packets 205 to STA 115-*a* at a periodicity 215. STA 105-*a* may also transmit packets according to a periodicity, which may be the same or different from the periodicity 215. In some examples, the periodicity of the VoWi-Fi traffic may vary depending on the codec(s) involved in the communication.

At times during a VoWi-Fi call, VoWi-Fi voice packets may be uplink only, downlink only, or bi-directional (e.g., both uplink and downlink). At other times, the radio frequency spectrum band used for the VoWi-Fi call may be silent, or inactive (e.g., neither uplink nor downlink voice packets associated with STA 115-*a* are present). In the example depicted in wireless communications system 200, AP 105-*a* may be transmitting downlink voice packets 205 to STA 115-*a*, but STA 115-*a* may not be transmitting uplink voice packets (e.g., the traffic may be downlink only). Such a scenario may occur, for example, when STA 115-*a* is on mute, or when voice activity detection/silence suppression is enabled (e.g., when periodic voice packets are suppressed during a silent period). In such cases, STA 115-*a* may transmit uplink comfort noise (CN) packets 210 which may assist AP 105-*a* in differentiating between an active call and a dead call. The uplink CN packets 210 may be generated by a codec included in STA 115-*a* and may be sent with a higher periodicity than uplink voice packets. If traffic is uplink only, AP 105-*a* may transmit downlink CN packets while STA 115-*a* transmits uplink voice packets. If the radio frequency spectrum band is silent, both STA 105-*a* and AP 105-*a* may transmit CN packets. If traffic on the channel is bi-directional, neither STA 115-*a* nor AP 105-*a* may send CN packets.

As described herein, STA 115-*a* may detect when it is participating in an ongoing voice call by analyzing the periodicity of packets transmitted or received (e.g., based on the periodicity of packet arrival time), for example in the absence of an explicit indication that packets are voice packets. For example, STA 115-*a* may detect that AP 105-*a* is transmitting downlink voice packets 205 with a periodicity 215. Additionally or alternatively (e.g., when traffic is bi-directional or uplink only), STA 115-*a* may detect that uplink voice packets are being sent with a certain periodicity. STA 115-*a* may detect the ongoing voice call based on the periodicity of voice packets or based on the periodicity of CN packets. In some cases, the ongoing voice call may be detected based on a PS-Poll success rate. For instance, STA 115-*a* may detect a voice call if a PS-Poll success rate has a specific periodicity that is aligned to code speech packet generation and is greater that a predetermined threshold. The success rate of PS-Polls may refer to the number, ratio, or percentage of PS-Polls that result in downlink voice packets 205 from AP 105-*a*. In some cases, an ongoing voice call may be detected based on proprietary signaling between the Internet Protocol (IP) Multimedia Subsystem (IMS) stack and the Wi-Fi system (e.g., the Wi-Fi radio, transceiver, one or more processors, system, etc.). A STA may implement a combination of these and/or other techniques for detecting the periodicity and/or type of a communication (e.g., in operating conditions or jurisdictions where access category or other traffic type indicators are forbidden).

Prior to detection of the ongoing voice call, STA 115-*a* may be operating in a first power mode (e.g., PM0). Upon detection of the ongoing voice call, STA 115-*a* may enter an Auto PS-Poll Mode (APPM). For example, STA 115-*a* may switch from the first power mode (e.g., PM0) to a second power mode (e.g., PM1). While in APPM, STA 115-*a* may continue to operate in PM1 in between uplink voice packets rather than switching back to PM0 (e.g., to transmit each uplink voice packet). Thus, STA 115-*a* may avoid a delay in transitioning from PM0 (used to transmit an uplink voice packet) back to PM1 after an inactivity interval. Also during APPM, STA 115-*a* may transmit speculative PS-Polls. Because STA 115-*a* transmits uplink voice packets in PM1, STA 115-*a* can enter a sleep mode as soon as the transmission is complete (e.g., for uplink only communications) or right after a downlink transmission opportunity corresponding to a speculative PS-Poll occurs. STA 115-*a* may exit APPM upon termination of the voice call or upon some other trigger.

The speculative PS-Polls may be sent according to a schedule (e.g., a service interval aligned with or based on the periodicity of uplink voice packets). But in some cases, (e.g., during voice activity detection (VAD)), packets may not be exchanged at a regular interval. In such scenarios, sending speculative PS-Polls at a fixed service interval may consume unnecessary power. Thus, a STA 115 may update or adjust the speculative PS-Poll service interval based on the success, or failure, of speculative PS-Polls (e.g., the service interval may be variable). For instance, STA 115-*a* may determine that a predetermined threshold number of speculative PS-Polls (e.g., 2) have failed to result in corresponding downlink transmissions (e.g., downlink voice packets) and increase the service interval (e.g., from 25 ms to 50 ms). Thus, the STA 115 may decrease the rate at which speculative PS-polls are sent. A STA 115 that is sending speculative PS-Polls with an increased service interval (or decreased rate) may be referred to as operating at delayed interval. If, while operating at delayed interval, the STA 115 determines that a pre-determined threshold number of speculative PS-Polls (e.g., 3) have failed (e.g., result in no response or null data), the STA 115 may suspend operating at APPM. Thus, the STA 115 may further save power by avoiding unnecessarily waking up to send speculative PS-Polls when the link is silent.

Figure 3A:
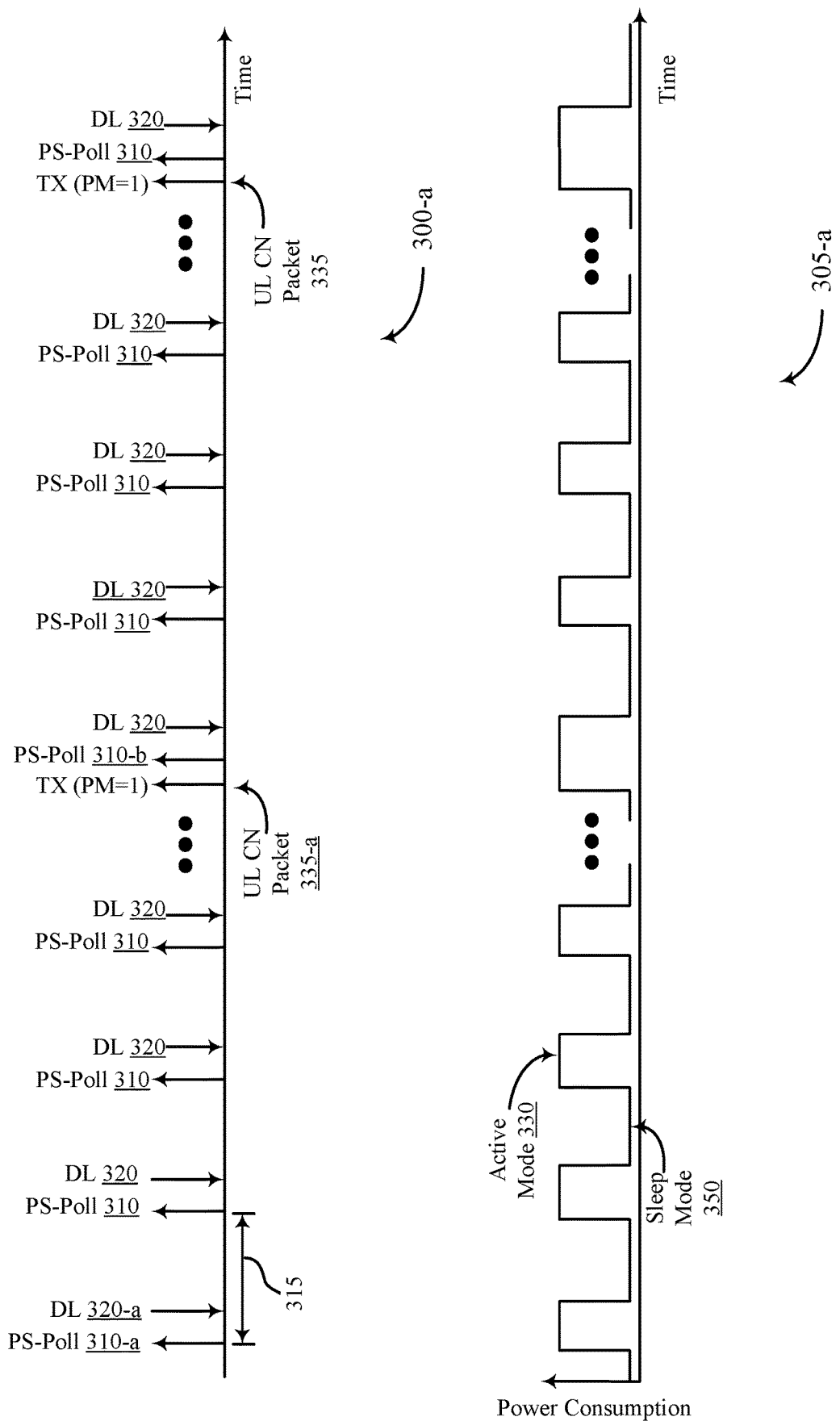
FIGS. 3A-3D illustrate examples of signaling and corresponding power mode timing diagrams for power management during voice calls in accordance with various aspects of the present disclosure.

FIG. 3A illustrates an example of signaling 300-*a* and corresponding power mode timing diagram 305-*a* for power management during voice calls in accordance with various aspects of the present disclosure. Signaling 300-*a* may represent aspects of VoWi-Fi communications between an AP 105 and STA 115 while the STA 115 is in APPM as described with reference to FIGS. 1-2. Signaling 300-*a* may represent downlink only traffic, from the perspective of the STA 115, with respect to voice packets. Power mode timing diagram 305-*a* shows the power consumption of the STA 115 when it transitions between power modes based on signaling 300-*a*. Prior to signaling 300-*a*, the STA 115 may determine its involvement in a VoWi-Fi voice call (e.g., by identifying the periodicity of the voice call) and transition from PM0 to PM1 based on the determination.

During APPM, the STA 115 may transmit speculative PS-Polls 310 while in active mode 330 of PM1 and according to a periodicity (e.g., according to service interval 315). The active mode may correspond to a higher power consumption as illustrated in power mode timing diagram 305-*a*. For example, the STA 115 may transmit speculative PS-Poll 310-*a* at the beginning of service interval 315. Service interval 315 may be associated with the periodicity that uplink voice packets would be sent if they were available at the STA 115. The STA 115 may remain in active mode 330 until after a downlink transmission opportunity associated with speculative PS-Poll 310-*a* occurs. For example, the STA 115 may be awake in active mode 330 until after it receives a downlink voice packet 320-*a* that is in response to speculative PS-Poll 310-*a*. After downlink voice packet 320-*a* is received, the STA 115 may enter sleep mode 350. In some cases, a speculative PS-Poll 310 may be preceded by an uplink CN packet 335. For example, speculative PS-Poll 310-*b* may be transmitted after uplink CN packet 335-*a*, which is transmitted while the STA 115 is in active mode 330.

Figure 3B:
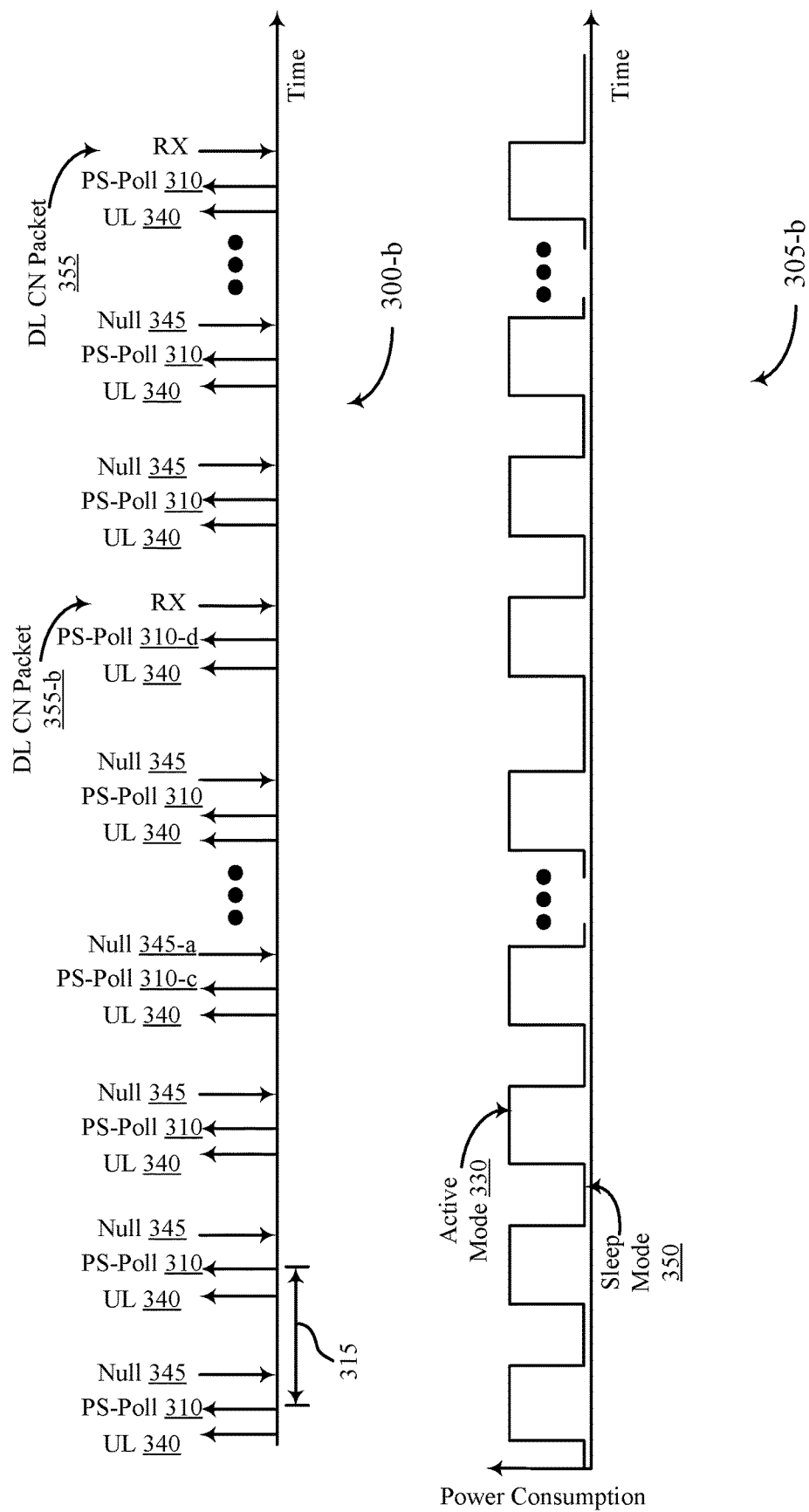

FIG. 3B illustrates an example of signaling 300-*b* and corresponding power mode timing diagram 305-*b* for power management during voice calls in accordance with various aspects of the present disclosure. Signaling 300-*b* may represent aspects of VoWi-Fi communications between an AP 105 and STA 115 while the STA 115 is in APPM as described with reference to FIGS. 1-2. Signaling 300-*b* may represent uplink only traffic, from the perspective of the STA 115, with respect to voice packets. Power mode timing diagram 305-*b* shows the power consumption of the STA 115 when it transitions between power modes based on signaling 300-*b*. Prior to signaling 300-*b*, the STA 115 may determine its involvement in a VoWi-Fi voice call (e.g., by identifying the periodicity of the voice call) and transition from PM0 to PM1 based on the determination.

During APPM, the STA 115 may transmit uplink voice packets 340 to an AP 105. The uplink voice packets 340 may be transmitted while the STA 115 is in active mode 330 of PM1. The STA 115 may also transmit speculative PS-Polls 310 while in active mode 330 of PM1 and according to a periodicity (e.g., according to service interval 315). The periodicity of speculative PS-Polls 310 may be based on the periodicity of uplink voice packets 340 (e.g., speculative PS-Polls 310 may be sent a predetermined threshold amount of time after transmission of uplink voice packets 340). The STA 115 may remain awake in active mode 330 until after a downlink transmission opportunity associated with a speculative PS-Poll 310 occurs. For example, the STA 115 may be awake in active mode 330 until after it receives a null packet 345-*a* that is in response to speculative PS-Poll 310-*c*. After null packet 345-*a* is received, the STA 115 may enter sleep mode 350. The STA 115 may leave sleep mode 350 and enter active mode 330 to transmit uplink voice packets 340. In some cases, a speculative PS-Poll 310 may be followed by a downlink CN packet 355. For example, speculative PS-Poll 310-*d* may be transmitted before downlink CN packet 355-*b*, which is transmitted while the STA 115 is in active mode 330.

Figure 3C:
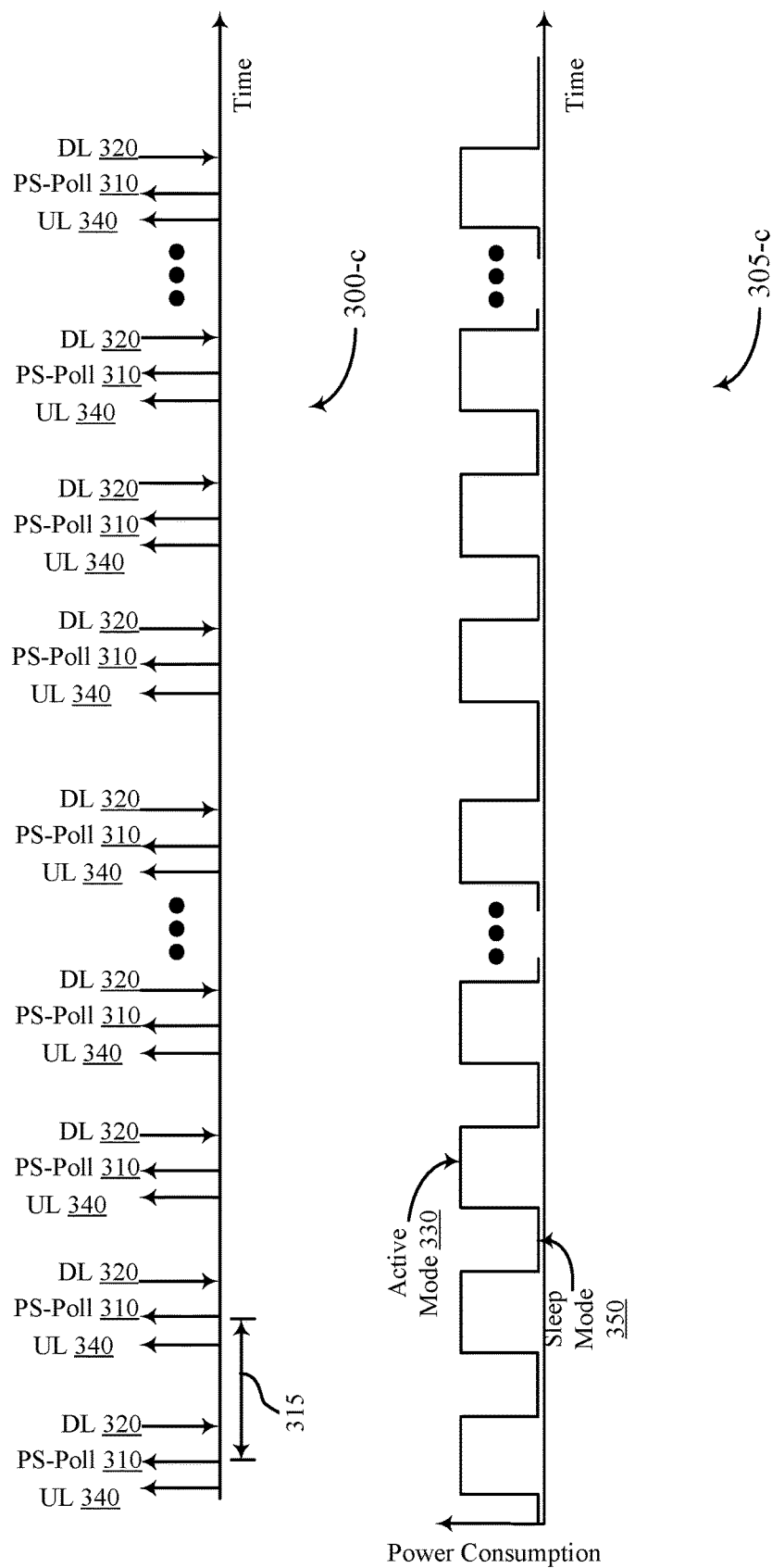

FIG. 3C illustrates an example of signaling 300-*c* and corresponding power mode timing diagram 305-*c* for power management during voice calls in accordance with various aspects of the present disclosure. Signaling 300-c may represent aspects of VoWi-Fi communications between an AP 105 and STA 115 while the STA 115 is in APPM as described with reference to FIGS. 1-2. Signaling 300-c may represent signaling, from the perspective of the STA 115, that is present on a radio frequency spectrum when an ongoing voice call includes bi-directional traffic (e.g., both uplink and downlink voice packets). Power mode timing diagram 305-c shows the power consumption of the STA 115 when it transitions between power modes based on signaling 300-c. Prior to signaling illustrated in 300-c, the STA 115 may determine its involvement in a VoWi-Fi voice call (e.g., by identifying the periodicity of the voice call) and transition from PM0 to PM1 based on the determination.

During APPM, the STA 115 may transmit uplink voice packets 340 to an AP 105. The uplink voice packets 340 may be transmitted while the STA 115 is in active mode 330 of PM1. The STA 115 may also transmit speculative PS-Polls 310 while in active mode 330 of PM1 and according to a periodicity (e.g., according to service interval 315). The STA 115 may remain in awake in active mode 330 until after a downlink transmission opportunity associated with a speculative PS-Poll 310 occurs. For example, the STA 115 may be awake in active mode 330 until after it receives a downlink voice packet 320 that is in response to a speculative PS-Poll. After the downlink voice packet 320 is received, the STA 115 may enter sleep mode 350. The STA 115 may leave sleep mode 350 and enter active mode 330 to transmit uplink voice packets 340.

Figure 3D:
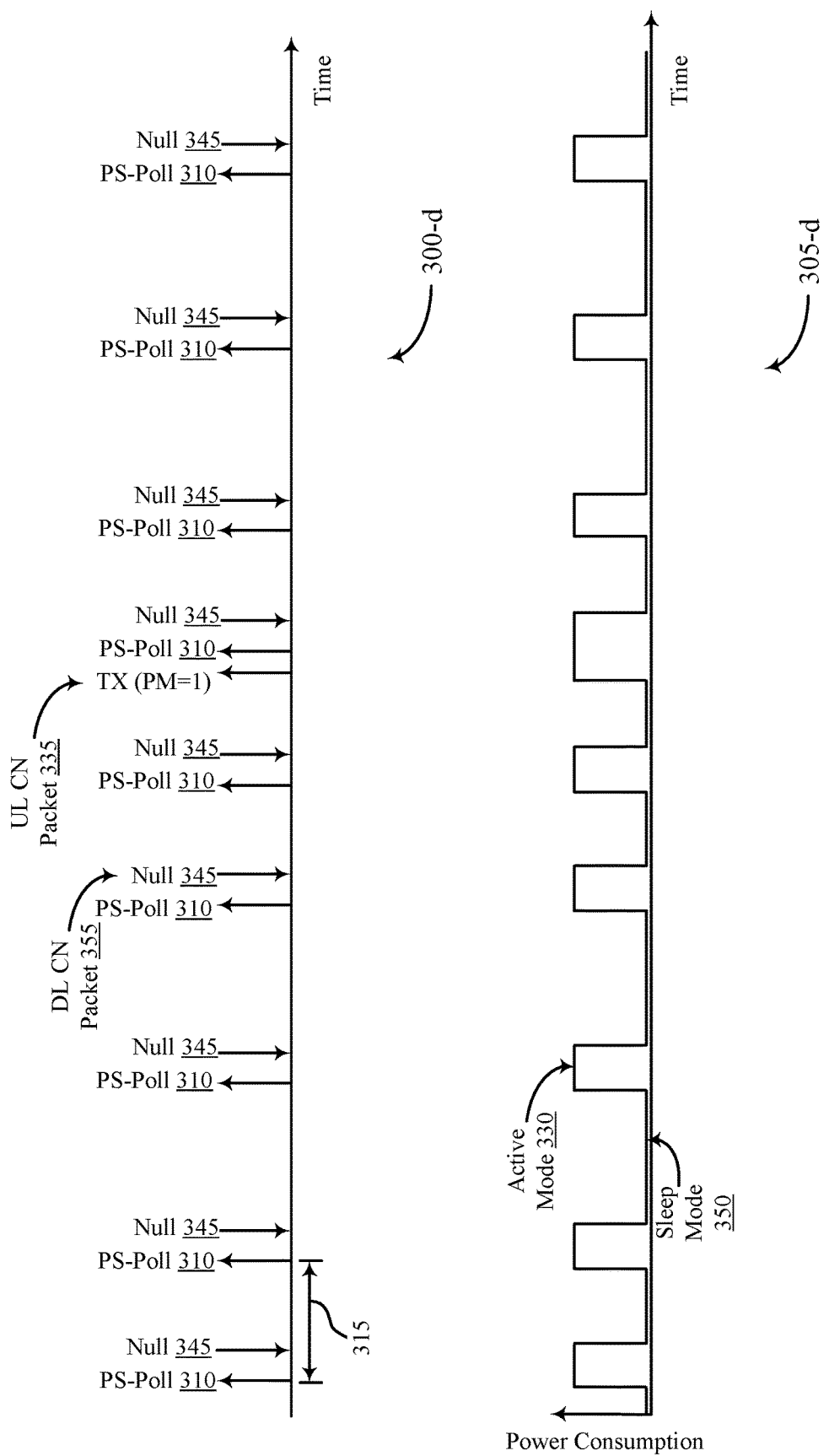

FIG. 3D illustrates an example of signaling 300-d and corresponding power mode timing diagram 305-d for power management during voice calls in accordance with various aspects of the present disclosure. Signaling 300-d may represent aspects of VoWi-Fi communications between an AP 105 and STA 115 while the STA 115 is in APPM as described with reference to FIGS. 1-2. Signaling 300-d may represent signaling that is present on a radio frequency spectrum when an ongoing voice call is silent in both directions from the perspective of the STA 115 (e.g., there are no uplink or downlink voice packets). Power mode timing diagram 305-d shows the power consumption of the STA 115 when it transitions between power modes based on signaling 300-d. Prior to signaling 300-d, the STA 115 may determine its involvement in a VoWi-Fi voice call (e.g., by identifying the periodicity of the voice call) and transition from PM0 to PM1 based on the determination.

During APPM, the STA 115 may transmit speculative PS-Polls 310 while in active mode 330 of PM1 and according service interval 315. The STA 115 may remain in awake in active mode 330 until after a downlink transmission opportunity associated with a speculative PS-Poll 310 occurs. For example, the STA 115 may be awake in active mode 330 until after it receives a downlink null packet 345 that is in response to a speculative PS-Poll. After the downlink null packet 345 is received, the STA 115 may enter sleep mode 350. The STA 115 may leave sleep mode 350 and enter active mode 330 to transmit speculative PS-Polls 310. Thus, according to the techniques described here, a STA 115 may enter a sleep mode after a downlink packet is received in response to a PS-Poll or after a downlink transmission opportunity associated with a PS-Poll occurs.

Figure 4A:
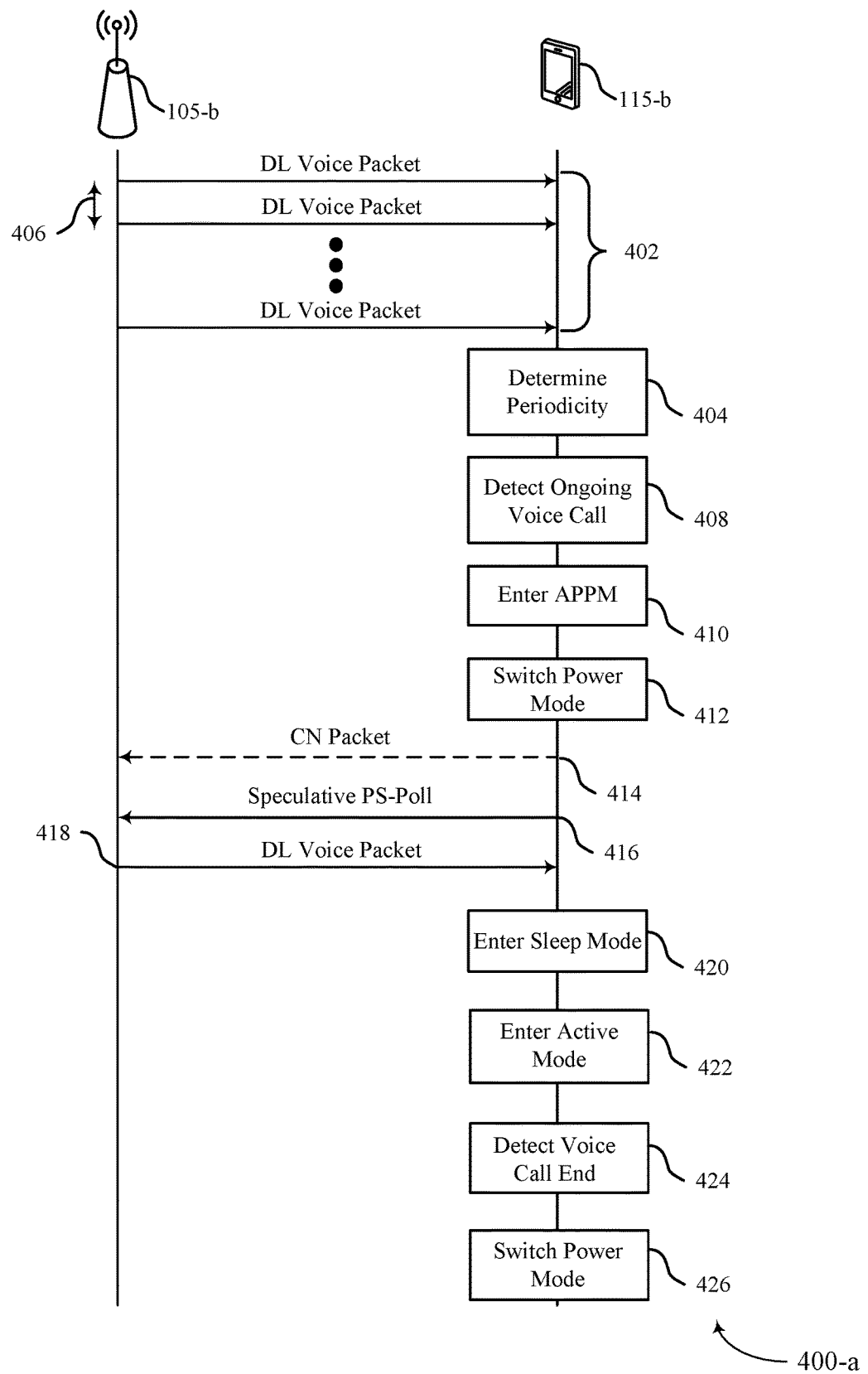
FIGS. 4A and 4B illustrate process flows for power management during voice calls in accordance with various aspects of the present disclosure.

FIG. 4A illustrates an example of a process flow 400-a for power management during voice calls in accordance with various aspects of the present disclosure. Process flow 400-a may represent aspects of techniques performed by an AP 105 and STA 115 during downlink only communications. STA 115-b and AP 105-b may be participating in an ongoing voice call. STA 115-b may reduce power consumption by selectively entering various power modes during the voice call. Prior to detection of the voice call, STA 115-b may be operating in a first power mode (e.g., PM0).

At 402, STA 115-b may receive a number of downlink voice packets from AP 105-b. The downlink voice packets may be sent according to a periodic schedule. Even though packets are being received, STA 115-b or certain components of STA 115-b may be unaware that the voice call is ongoing. At 404, STA 115-b may determine the periodicity 406 of the downlink voice packets. At 408, STA 115-b may detect the ongoing voice call based on the periodicity 406 of the received voice packets. At 410, STA 115-b may enter APPM based on the detection of the voice call. For example, STA 115-b may switch from the first power mode (e.g., PM0) to a second power mode (e.g., PM1) at 412. While operating in PM1, STA 115-b may send a comfort noise packet at 414 if communications between STA 115-b and AP 105-b are downlink only voice communications. If process flow 400-a represented bi-directional voice communications rather than downlink only voice communications, the packet sent at 414 may be an uplink voice packet instead of a comfort noise packet. STA 115-b may also, at 416, transmit a speculative PS-Poll to AP 105-b. In response to the speculative PS-Poll, STA 115-b may receive a downlink voice packet at 418. STA 115-b may enter a sleep mode at 420 based on reception of the downlink voice packet. At 422, STA 115-b may leave the sleep mode and enter active mode (e.g., to transmit or receive one or more packets). STA 115-b may enter active mode based on a schedule and/or based on the periodicity of uplink or downlink packets. At 424, STA 115-b may detect the end of the voice call. In response to detecting the end of the voice call, STA 115-b may switch power modes at 426 from PM1 to PM0. Alternatively, STA 115-b may re-enter the sleep mode.

Figure 4B:
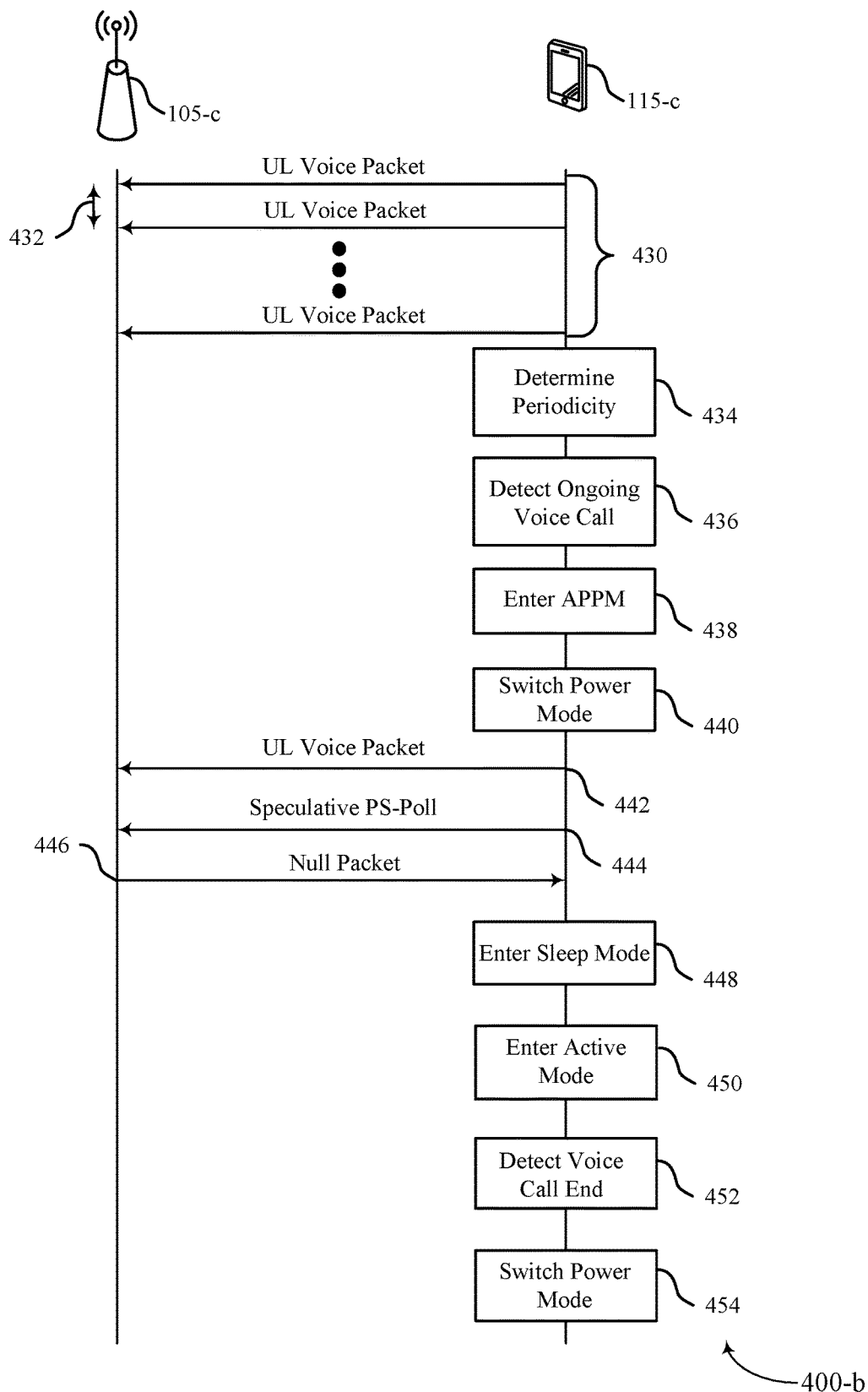

FIG. 4B illustrates an example of a process flow 400-b for power management during voice calls in accordance with various aspects of the present disclosure. Process flow 400-a may represent aspects of techniques performed by an AP 105 and STA 115 during uplink only voice communications. STA 115-c and AP 105-c may be participating an ongoing voice call. STA 115-c may reduce power consumption by selectively entering various power modes during the voice call. Prior to detection of the voice call, STA 115-c may be operating in a first power mode (e.g., PM0).

At 430, STA 115-c may transmit a number of uplink voice packets to AP 105-c. The uplink voice packets may be sent with a periodicity 432. At 434, STA 115-c may determine the periodicity 432 of the uplink voice packets. The determination of periodicity 432 may occur during some of the same time as the transmission of uplink voice packets at 430. At 436, STA 115-c may detect the ongoing voice call based on the determined periodicity 432 of the uplink voice packets. STA 115-c, or certain components of STA 115-c, may be unaware that the voice call is ongoing until analysis of the periodicity of the uplink voice packets. At 438, STA 115-c may enter APPM based on the detection of the voice call. For example, STA 115-c may switch from the first power mode (e.g., PM0) to a second power mode (e.g., PM1) at 440.

While operating in PM1, STA 115-c may send an uplink voice packet at 442. STA 115-c may also, at 444, transmit a speculative PS-Poll to AP 105-c. The speculative PS-Poll may be aligned with or based on a periodicity associated with the uplink voice packet sent at 442. In response to the speculative PS-Poll, STA 115-c may receive a downlink null packet at 446 during a downlink transmission opportunity corresponding to the speculative PS-Poll. STA 115-*c* may enter a sleep mode at 448 based on the null packet received during the downlink transmission opportunity. At 450, STA 115-*c* may leave the sleep mode and enter active mode (e.g., to transmit or receive one or more packets). STA 115-*b* may enter active mode based on a schedule and/or based on the periodicity of uplink or downlink packets. At 452, STA 115-*c* may detect the end of the voice call. In response to detecting the end of the voice call, STA 115-*c* may switch from PM1 to PM0 at 454.

Figure 5:
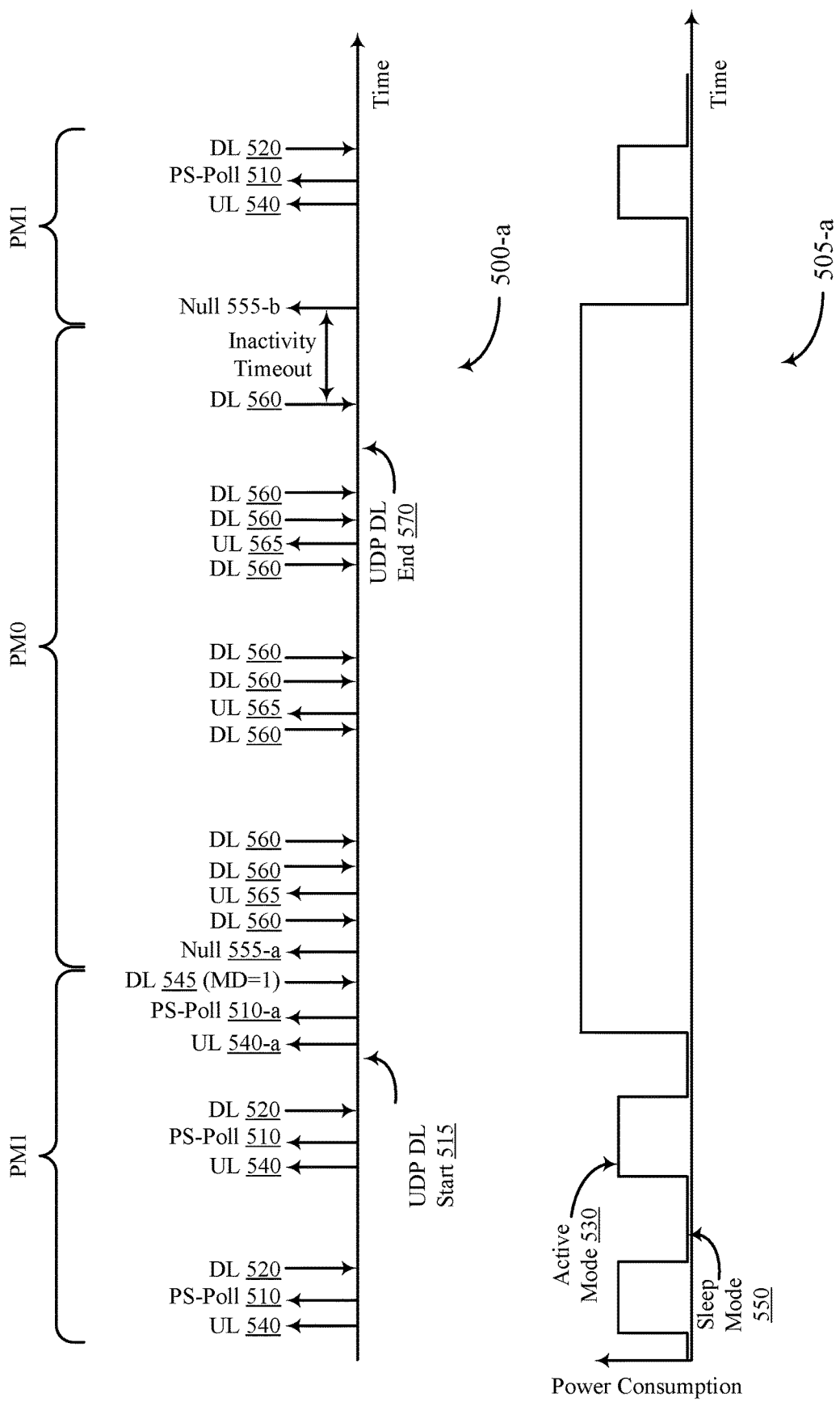
FIG. 5 illustrates an example of signaling and a corresponding power mode timing diagram for power management during voice calls in accordance with various aspects of the present disclosure.

FIG. 5 illustrates an example of signaling 500-*a* and corresponding power mode timing diagram 505-*a* for power management during voice calls in accordance with various aspects of the present disclosure. Signaling 500-*a* may represent aspects of VoWi-Fi communications between an AP 105 and STA 115 while the STA 115 is in APPM as described with reference to FIGS. 1-2. Signaling 500-*a* may represent traffic conditions, from the perspective of the STA 115, in which bi-directional voice traffic and non-voice traffic are present on a radio frequency spectrum band. Power mode timing diagram 505-*a* shows the power consumption of the STA 115 when it transitions between power modes based on signaling 500-*a*. Prior to signaling 500-*a*, the STA 115 may determine its involvement in a VoWi-Fi voice call (e.g., by identifying the periodicity of the voice call) and transition from PM0 to PM1 based on the determination.

During APPM, the STA 115 may transmit uplink voice packets 540 and speculative PS-Polls 510 while in active mode 530. The STA 115 may also receive downlink voice packets 520 in response to the speculative PS-Polls 510. At 515, non-voice traffic (e.g., user datagram protocol (UPD) traffic) that is intended for the STA 115 may be available at the AP 105. Before the STA 115 recognizes or detects the non-voice traffic, the STA 115 may send an uplink voice packet 540-*a* and a speculative PS-Poll 510-*a* while in active mode of PM1. In response to the speculative PS-Poll 510-*a*, the STA 115 may receive a downlink packet 545 that includes an indication that non-voice traffic is available for STA 115. For example, a flag included in the downlink packet 545 may be set (e.g., More Date (MD)=1)). The STA 115 may switch out of APPM (e.g., switch to active mode 530 of PM0) based on the indication by sending an uplink null packet 555-*a* to the AP 105 (e.g., by sending a null packet 555-*a* with the Power Management bit set to 0). Thus, the STA 115 may, by virtue of operating in PM0, receive multiple downlink non-voice packets 560 buffered at the AP 105 in response to speculative PS-Poll 510-*a*. While operating in PM0, the STA 115 may continue to send uplink packets 565, which may be voice packets, non-voice packets, and/or comfort noise packets.

The STA 115 may monitor an inactivity timer after reception of each downlink non-voice packet 560. If the inactivity timer expires, the STA 115 may determine that there is no more data for the STA 115 (e.g., at 570, when the AP 105 does not have any more non-voice traffic available for the STA 115) and enter APPM by transmitting an uplink null packet 555-*b* to the AP 105 (e.g., by transmitting a null packet 555-*b* with the Power Management bit set to 1). For example, the STA 115 may re-enter APPM upon detecting activity on the radio frequency spectrum band (e.g., upon detecting transmission or reception of a voice packet or upon reception of a TIM). Following the transition into APPM, the STA 115 may enter sleep mode 550 of PM1. The STA 115 may enter active mode 530 of PM1 to send uplink voice packets 540 and speculative PS-Polls 510 and to receive downlink voice packets 520.

Figure 6:
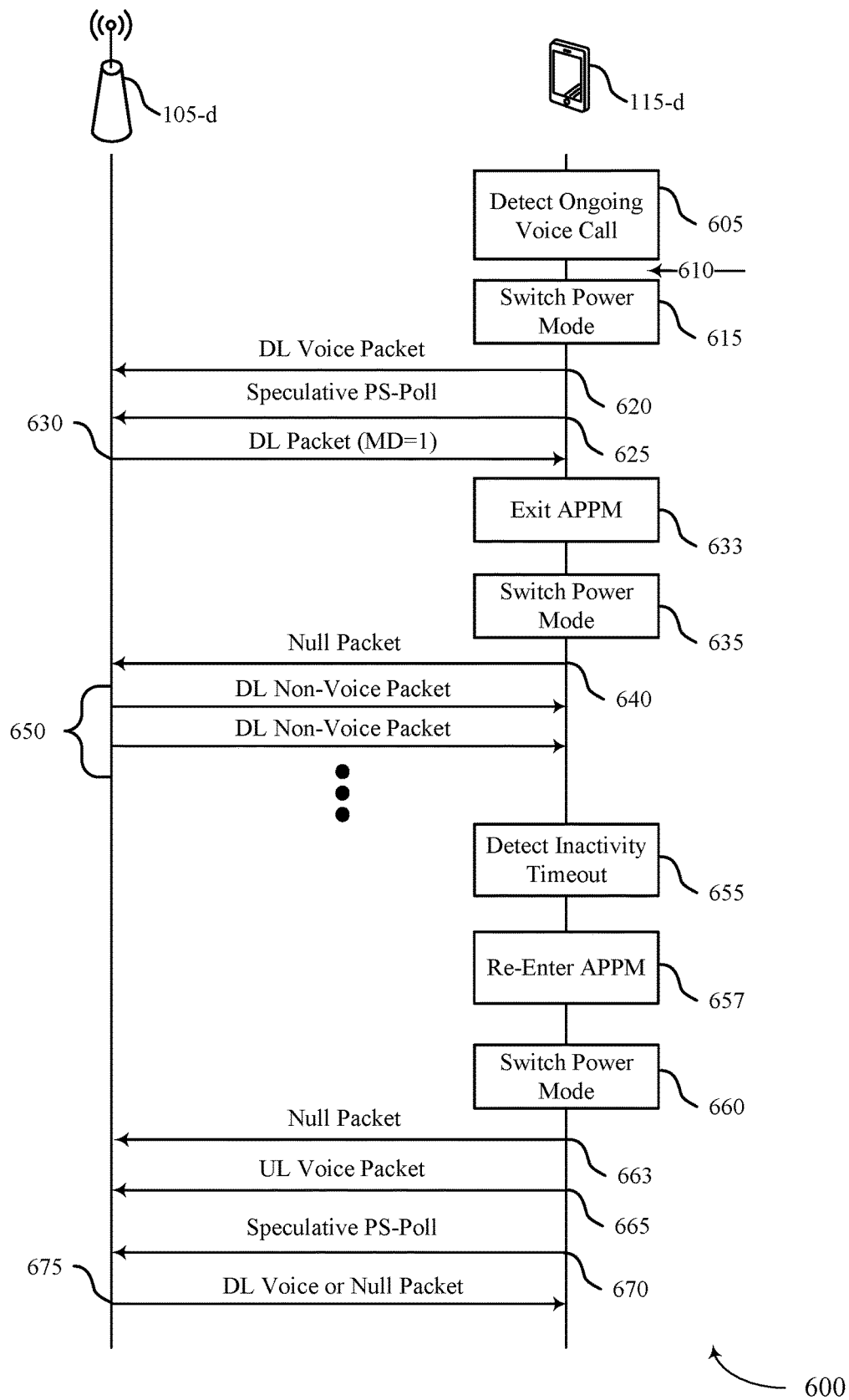
FIG. 6 illustrates a process flow for power management during voice calls in accordance with various aspects of the present disclosure.

FIG. 6 illustrates an example of a process flow 600 for power management during voice calls in accordance with various aspects of the present disclosure. Process flow 600 may represent aspects of techniques performed by an AP 105 and STA 115 when bi-directional voice traffic and non-voice traffic is on a radio frequency spectrum band. STA 115-*d* and AP 105-*d* may be participating an ongoing voice call. STA 115-*c* may reduce power consumption by selectively entering various power modes during the voice call. Prior to detection of the voice call, STA 115-*d* may be operating in a first power mode (e.g., PM0).

At 605, STA 115-*d* may detect the ongoing voice call based on the periodicity of the uplink and/or downlink voice packets. At 610, STA 115-*c* may enter APPM based on the detection of the voice call. For example, STA 115-*c* may switch from the first power mode (e.g., PM0) to a second power mode (e.g., PM1) at 615. While operating in PM1, STA 115-*d* may send an uplink voice packet at 620. STA 115-*d* may also, at 625, transmit a speculative PS-Poll to AP 105-*d*. In response to the speculative PS-Poll, STA 115-*d* may receive a downlink packet at 630 and during a downlink transmission opportunity corresponding to the speculative PS-Poll. The downlink packet may include an indication that non-voice data addressed to STA 115-*d* is buffered at AP 105-*d* (e.g., the downlink packet may include a flag, such as the More Data flag, that is set). Thus, STA 115-*d* may determine that non-voice data is available. In response, STA 115-*d* may leave APPM at 633. For example, STA 115-*d* may switch from PM1 to PM0 at 635, thereby enabling faster data acquisition from AP 105-*d*. STA 115-*d* may, at 640, send an uplink null packet to AP 105-*d* indicating that STA 115-*d* has switched power modes.

After STA 115-*d* changes to PM0 (e.g., by sending Null Data) at 640, AP 105-*d* may transmit a number of queued non-voice packets to STA 115-*d* at 650. STA 115-*d* may continue to transmit non-speculative PS-Polls and AP 105-*d* may continue to respond with downlink non-voice packets until STA 115-*d* detects an inactivity timeout at 655. At 657, STA 115-*d* may re-enter APPM. For example, at 660, STA 115-*d* may switch power modes (e.g., from PM0 to PM1) based on the detection of the inactivity timeout. STA 115-*d* may also, at 663, send a null packet to AP 105-*d* indicating the power mode transition. At 665, STA 115-*d* may transmit an uplink voice packet to AP 105-*d*. At 670, STA 115-*d* may transmit a speculative PS-Poll to AP 105-*d*. In response to the speculative PS-Poll, AP 105-*d* may transmit, and STA 115-*d* may receive, a downlink voice packet or a null data packet at 675. Thus, STA 115-*d* may continue the ongoing voice call in APPM.

Figure 7:
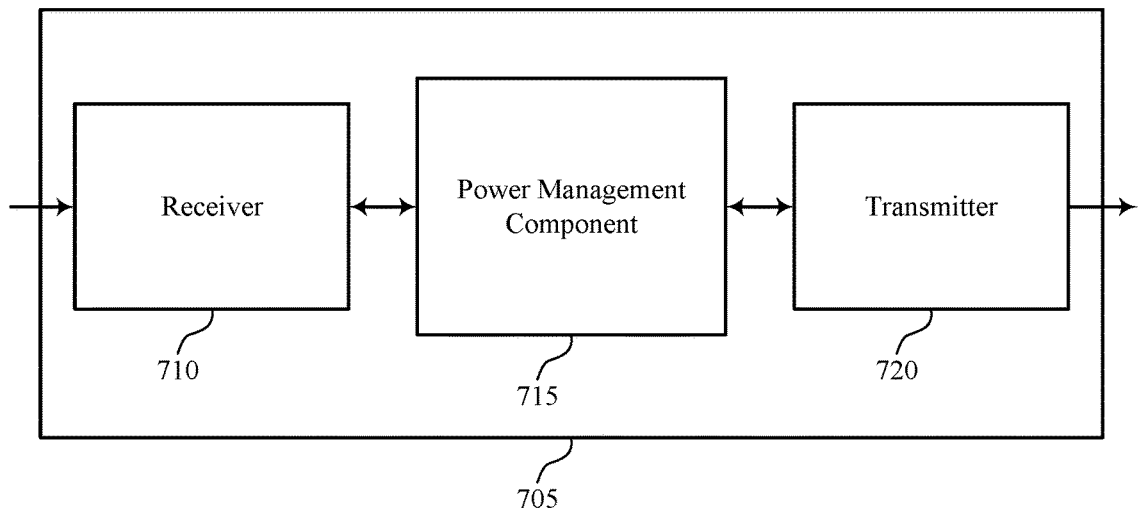
FIGS. 7 and 8 show block diagrams of a wireless device that supports power management during voice calls in accordance with various aspects of the present disclosure.

FIG. 7 shows a block diagram 700 of a wireless device 705 that supports power management during voice calls in accordance with various aspects of the present disclosure. Wireless device 705 may be an example of aspects of a STA 115 or an AP 105 as described with reference to FIGS. 1-6. Wireless device 705 may include receiver 710, power management component 715, and transmitter 720. Wireless device 705 may also include one or more processors, memory coupled with the one or more processors, and instructions stored in the memory that are executable by the one or more processors to enable the one or more processors to perform the power management features discussed herein. Each of these components may be in communication with one another (e.g., via one or more buses).

The receiver 710 may receive information such as packets, user data, or control information associated with various information channels (e.g., control channels, data channels, and information related to dynamic chain configuration selection, etc.). For example, the receiver 710 may receive packets (e.g., voice packets or non-voice packets) that are sent from an AP 105 over a radio frequency spectrum band. The receiver 710 may support reception of packets using various power modes (e.g., a first power mode and a second power mode). The receiver 710 may also be used to detect energy on a wireless channel. Information may be passed from the receiver 710 to other components of the wireless device 705. The receiver 710 may be an example of aspects of the transceiver 940 described with reference to FIG. 9.

The power management component 715 may be responsible for switching between power modes based on the type of communication in which wireless device 705 is engaged. For example, the power management component 715 may detect (e.g., while in a first power mode such as PM0) an ongoing voice call over a channel. The detection may be based on the periodicity of uplink or downlink packets sent over the channel. The power management component 715 may, based on the detection of the voice call, cause the wireless device 705 to switch from the first power mode to a second power mode (e.g., PM1). The power management component 715 may also cause the wireless device 705 to continue the voice call over the channel while in the second power mode. The power management component 715 may be an example of aspects of the power management component 815 described with reference to FIG. 8 and the power management component 915 described with reference to FIG. 9. In some cases, the power management component 715 may be a processor. The processor may be coupled with memory and execute instructions stored in the memory that enable the processor to perform or facilitate the power management features discussed herein.

The transmitter 720 may transmit signals generated by other components of the wireless device 705. For example, the transmitter 720 may transmit PS-Polls, speculative PS-Polls, voice packets, non-voice packets, and/or indications of the power mode for the wireless device 705. The transmitter 720 may support transmissions using a variety of power modes, including PM0 and PM1. In some examples, the transmitter 720 may be collocated with a receiver 710 in a transceiver module. For example, the transmitter 720 may be an example of aspects of the transceiver 940 described with reference to FIG. 9.

Figure 8:
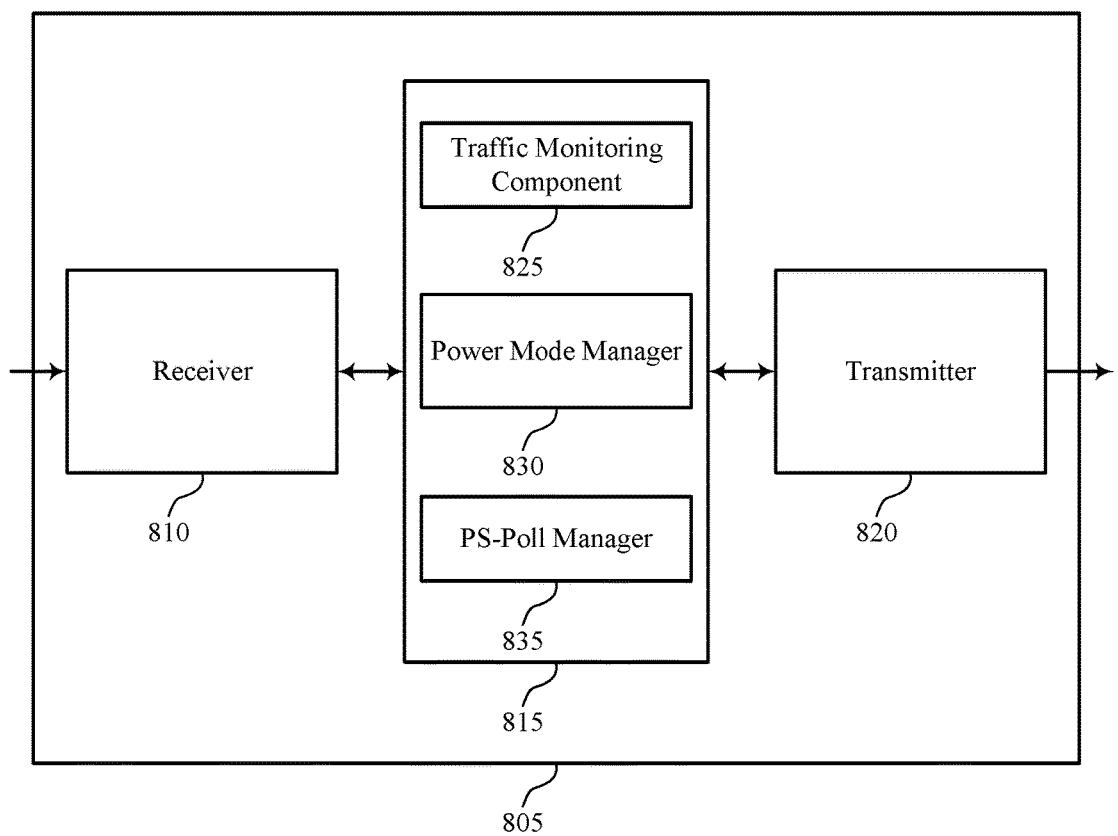

FIG. 8 shows a block diagram 800 of a wireless device 805 that supports power management during voice calls in accordance with various aspects of the present disclosure. Wireless device 805 may be an example of aspects of a wireless device 705, a STA 115, or an AP 105 as described with reference to FIGS. 1-7, respectively. Wireless device 805 may include receiver 810, power management component 815, and transmitter 820. Wireless device 805 may also include one or more processors, memory coupled with the one or more processors, and instructions stored in the memory that are executable by the one or more processors to enable the one or more processors to perform the power management features discussed herein. Each of these components may be in communication with one another (e.g., via one or more buses).

The receiver 810 may receive information such as packets (e.g., voice and/or non-voice packets), user data, or control information (e.g., TIMs) associated with various information channels (e.g., control channels, data channels, and information related to power management, etc.). Information may be passed on to other components of the wireless device 805. The receiver 810 may be an example of aspects of the transceiver 940 described with reference to FIG. 9.

The power management component 815 may be responsible for switching between power modes and modifying communications based on communication patterns or types such as described herein. The power management component 815 may include traffic monitoring component 825, power mode manager 830, and PS-Poll manager 835. The power management component 815 may be an example of aspects of the power management component 715 described with reference to FIG. 7.

The traffic monitoring component 825 may monitor traffic on a wireless channel, for example unlicensed radio frequency spectrum band. In some cases, traffic monitoring component 825 may detect (e.g., while in a first power mode such as PM0) that a voice call is ongoing over a channel. For example, traffic monitoring component 825 may monitor the periodicity of incoming or outgoing packets (e.g., downlink or uplink packets) and, based on the periodicity of the packets, determine that the packets are associated with a voice call. The traffic monitoring component 825 may pass an indication of the ongoing voice call to the power mode manager 830.

In some cases, the traffic monitoring component 825 may determine a periodicity of uplink packets associated with the ongoing voice call. The traffic monitoring component 825 may pass an indication of the uplink periodicity to the PS-Poll manager 835, which may facilitate the transmission of speculative PS-Polls based on the periodicity of the uplink packets. In some examples, the traffic monitoring component 825 may receive (e.g., via receiver 810 and in response to a speculative PS-Poll), a downlink frame that includes an indication that UDP traffic is pending for the wireless device 805. In some cases, the traffic monitoring component 825 may receive the UDP traffic while the wireless device 805 is in the first power mode.

In some cases, the traffic monitoring component 825 may be a processor (e.g., a transceiver processor, or a radio processor, or a receiver processor). The processor may be coupled with memory and execute instructions stored in the memory that enable the processor to perform or facilitate the traffic monitoring and voice call detection features discussed herein. A transceiver processor may be collocated with and/or communicate with (e.g., direct the operations of) a transceiver of the wireless device 805. A radio processor may be collocated with and/or communicate with (e.g., direct the operations of) a radio (e.g., a Wi-Fi radio) of the wireless device 805. A receiver processor may be collocated with and/or communicate with (e.g., direct the operations of) a receiver of the wireless device 805.

The power mode manager 830 may be responsible for switching power modes of the wireless device 805. For example, the power mode manager 830 may switch from a first power mode to a second power mode based on the detection of an ongoing voice call over a channel (e.g., an unlicensed radio frequency spectrum band). The first power mode may prohibit entry into a sleep mode and the second power mode may facilitate entry into the sleep mode. The power mode manager 830 may facilitate continuation of the voice call over the channel while in the second power mode. In some cases, the power mode manager 830 may cause the wireless device 805 to switch to the first power mode based at least in part on an indication that UDP traffic is pending for the wireless device 805. In such cases, the power mode manager 830 may cause the wireless device 805 to switch to the second power mode when the channel (e.g., a radio frequency spectrum band) is free of UDP traffic (e.g., for a predetermined threshold of time).

In some examples, the power mode manager 830 may cause the wireless device 805 to enter a sleep mode based on detection (e.g., by the traffic monitoring component 825) that the voice call has ended. Upon exit from the sleep mode by the wireless device 805, the power mode manager 830 may cause the wireless device 805 to transition to the first power mode. In some cases, the power mode manager 830 may be a processor. The processor may be coupled with memory and execute instructions stored in the memory that enable the processor to perform or facilitate the power mode switching features discussed herein.

The PS-Poll manager 835 may operate in combination with other components of wireless device 805 (e.g., transmitter 820) to facilitate the transmission of PS-Polls (e.g., non-speculative PS-Polls and/or speculative PS-Polls). In some cases, the PS-Poll manager 835 cause transmission of a speculative PS-Poll based on switching from the first power mode to the second power mode. The speculative PS-Poll may be transmitted independent of a downlink TIM. In some examples, the PS-Poll manager 835 may determine that a predetermined threshold number of consecutive PS-Polls have failed to result in downlink transmissions of data for the wireless device 805. The PS-Poll manager 835 may decrease the rate at which speculative PS-Polls are sent based on the determination. In some cases, the PS-Poll manager 835 may be a processor (e.g., a transceiver processor or a radio processor). The processor may be coupled with memory and execute instructions stored in the memory that enable the processor to perform or facilitate the chain configuration selection features discussed herein.

The transmitter 820 may transmit signals generated by other components of the wireless device 805. In some examples, the transmitter 820 may be collocated with a receiver 810 in a transceiver module. For example, the transmitter 820 may be an example of aspects of the transceiver 940 described with reference to FIG. 9.

Figure 9:
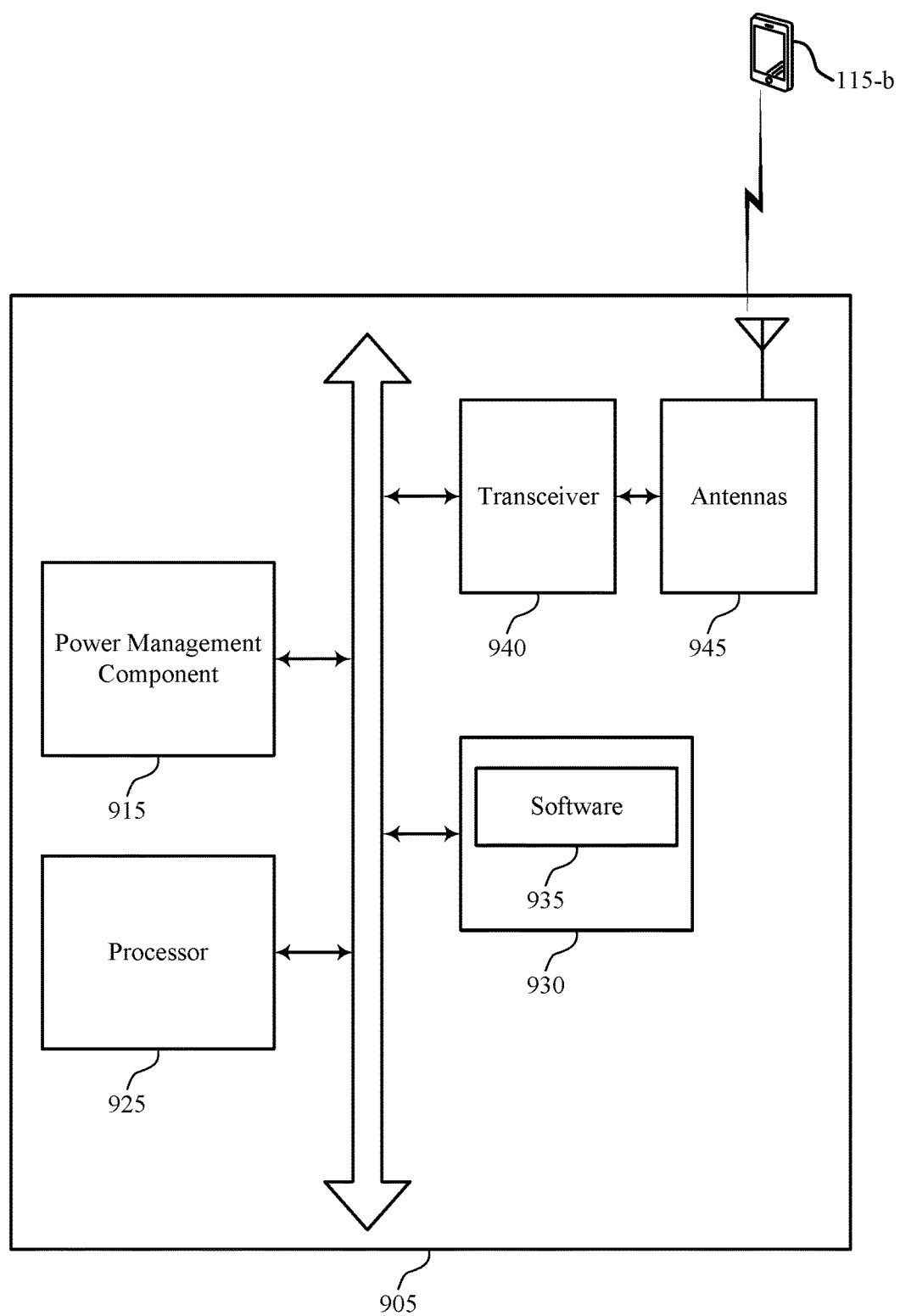
FIG. 9 illustrates a block diagram of a system including a wireless device that supports power management during voice calls in accordance with various aspects of the present disclosure.

FIG. 9 shows a diagram of a system 900 including a wireless device 905 that supports power management during voice calls in accordance with various aspects of the present disclosure. Wireless device 905 may be an example of a wireless device 705, a wireless device 805, a STA 115, or an AP 105 as described above, e.g., with reference to FIGS. 1-8. The wireless device 905 may support operation in various power modes such as described herein.

Wireless device 905 may include components for bi-directional voice and data communications including components for transmitting and receiving communications, including power management component 915, processor 925, memory 930, software 935, transceiver 940, and antennas 945. The processor 925 may include an intelligent hardware device, (e.g., a central processing unit (CPU), a microcontroller, an application specific integrated circuit (ASIC), etc.). The memory 930 may include random access memory (RAM) and read only memory (ROM). The memory 930 may store computer-readable, computer-executable software 935 including instructions that, when executed, cause the processor to perform various functions described herein. In some cases, the memory 930 can contain, among other things, a Basic Input-Output system (BIOS) which may control basic hardware and/or software operation such as the interaction with peripheral components or devices.

Software 935 may include code to implement aspects of the present disclosure, including code to support dynamic chain configuration selection. Software 935 can be stored in a non-transitory computer-readable medium such as system memory or other memory. In some cases, the software 935 may not be directly executable by the processor but may cause a computer (e.g., when compiled and executed) to perform functions described herein. The transceiver 940 may communicate bi-directionally, via one or more antennas, wired, or wireless links as described above. For example, the transceiver 940 may represent a wireless transceiver and may communicate bi-directionally with another wireless transceiver. The transceiver 940 may also include a modem to modulate the packets and provide the modulated packets to the antennas 945 for transmission (e.g., to STA 115-b), and to demodulate packets received from the antennas 945. In some cases, the wireless device 905 may include a single antenna 945. However, in some cases the device may have more than one antenna 945, which may be capable of concurrently transmitting or receiving multiple wireless transmissions.

Figure 10:
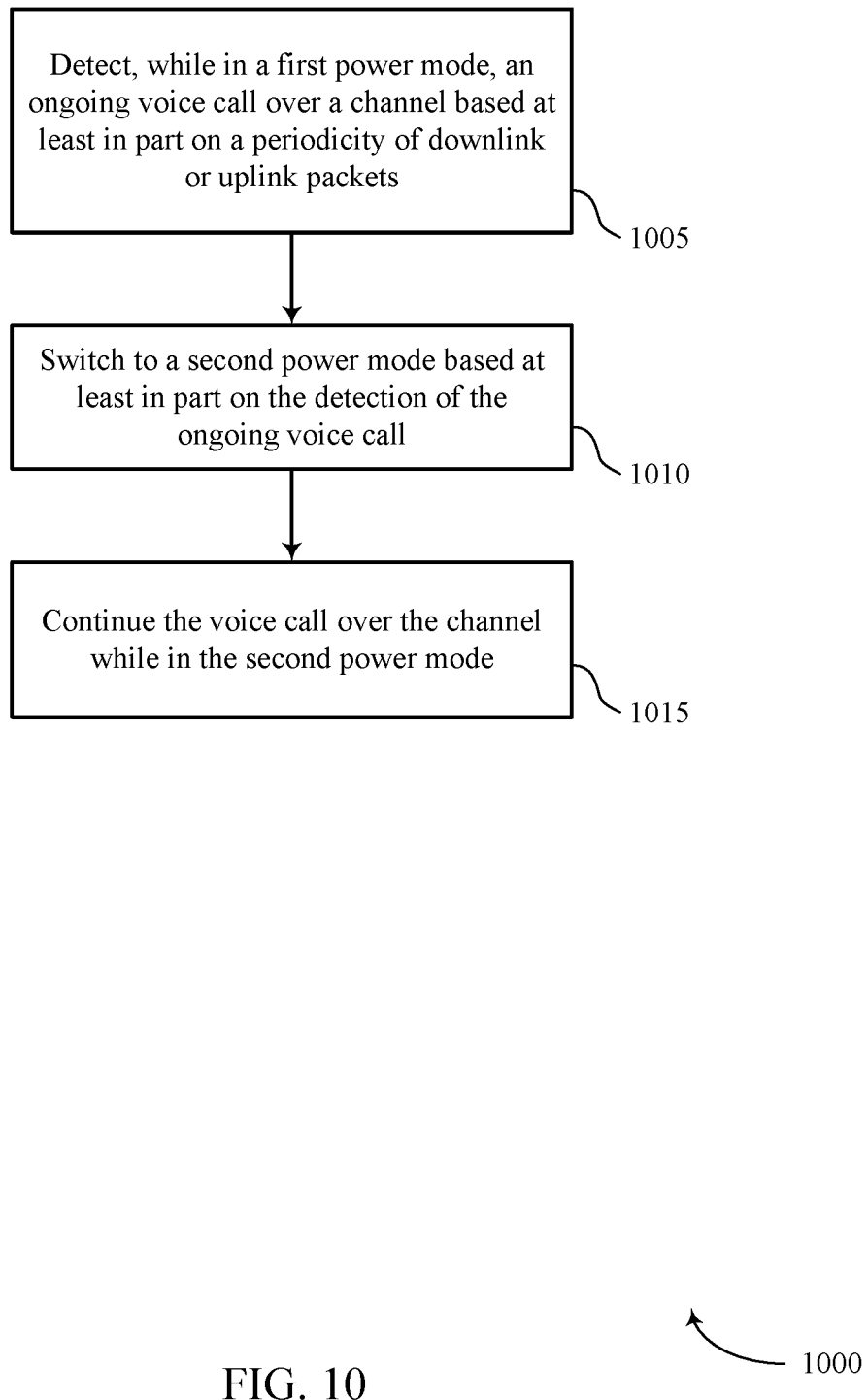
FIGS. 10 through 12 illustrate methods for power management during voice calls in accordance with various aspects of the present disclosure.

FIG. 10 shows a flowchart illustrating a method 1000 for power management during voice calls in accordance with various aspects of the present disclosure. The operations of method 1000 may be implemented by a wireless device or its components as described herein. For example, the operations of method 1000 may be performed by a power management component as described with reference to FIGS. 7 through 9. In some examples, a wireless device may execute a set of codes to control the functional elements of the device to perform the functions described below. Additionally or alternatively, the wireless device may perform aspects the functions described below using special-purpose hardware.

At block 1005, the method may include detecting, while in a first power mode, an ongoing voice call over a channel based at least in part on a periodicity of downlink or uplink packets. The operations of block 1005 may be performed according to the methods described with reference to FIGS. 2 through 6. In certain examples, the operations of block 1005 may be performed by a traffic monitoring component as described with reference to FIG. 8. At block 1010, the method may include switching to a second power mode based at least in part on the detection of the ongoing voice call. The operations of block 1010 may be performed according to the methods described with reference to FIGS. 2 through 6. In certain examples, the operations of block 1010 may be performed by a power mode manager as described with reference to FIG. 8. At block 1015, the method may include continuing the voice call over the channel while in the second power mode. The operations of block 1015 may be performed according to the methods described with reference to FIGS. 2 through 6. In certain examples, the operations of block 1015 may be performed by a power mode manager as described with reference to FIG. 8.

Figure 11:
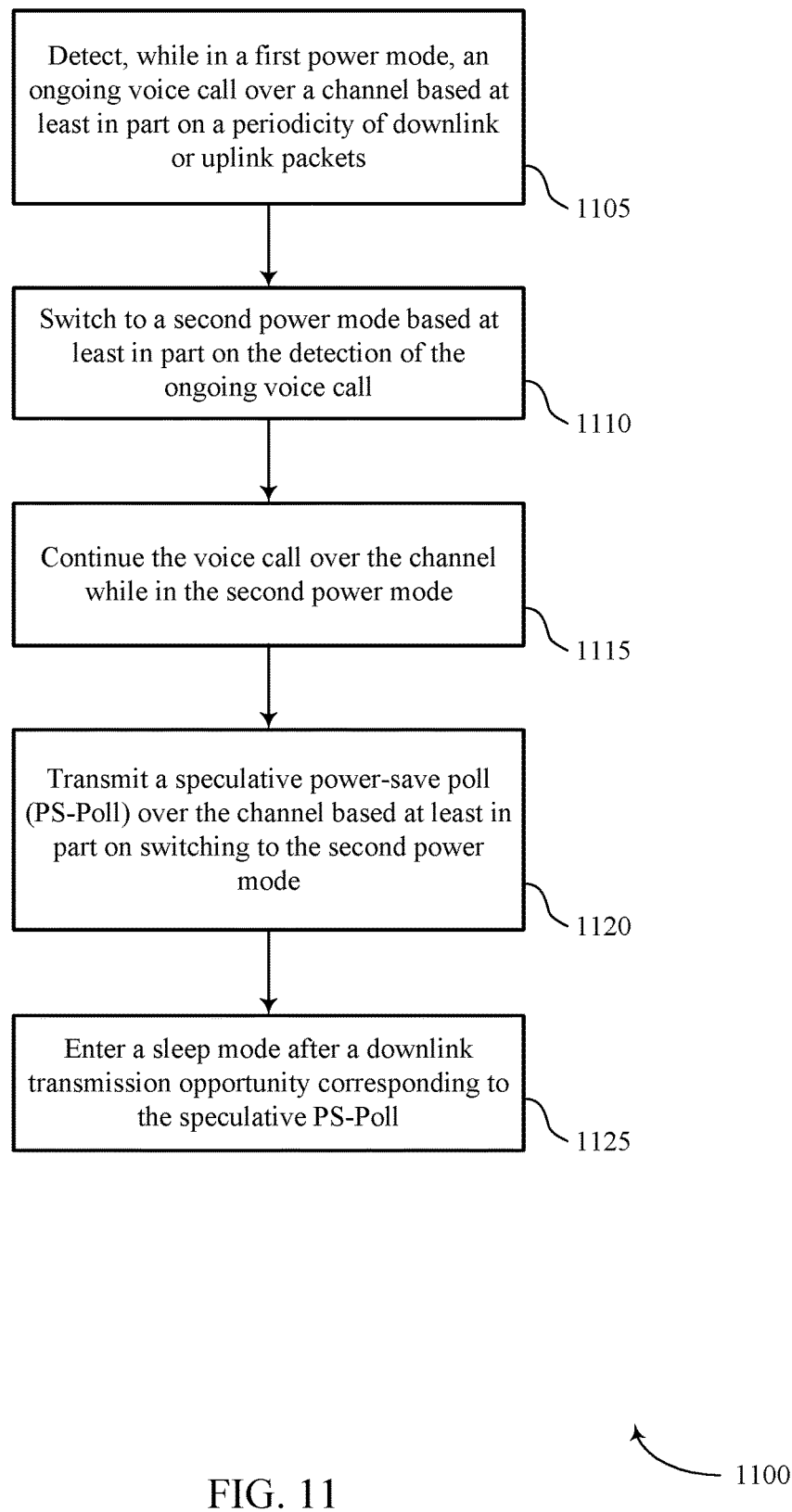

FIG. 11 shows a flowchart illustrating a method 1100 for power management during voice calls in accordance with various aspects of the present disclosure. The operations of method 1000 may be implemented by a wireless device or its components as described herein. For example, the operations of method 1000 may be performed by a power management component as described with reference to FIGS. 7 through 9. In some examples, a wireless device may execute a set of codes to control the functional elements of the device to perform the functions described below. Additionally or alternatively, the wireless device may perform aspects the functions described below using special-purpose hardware.

At block 1105, the method may include detecting, while in a first power mode, an ongoing voice call over a channel based at least in part on a periodicity of downlink or uplink packets. The operations of block 1105 may be performed according to the methods described with reference to FIGS. 2 through 6. In certain examples, the operations of block 1105 may be performed by a traffic monitoring component as described with reference to FIG. 8. At block 1110, the method may include switching to a second power mode based at least in part on the detection of the ongoing voice call. The operations of block 1110 may be performed according to the methods described with reference to FIGS. 2 through 6. In certain examples, the operations of block 1110 may be performed by a power mode manager as described with reference to FIG. 8.

At block 1115, the method may include continuing the voice call over the channel while in the second power mode. The operations of block 1115 may be performed according to the methods described with reference to FIGS. 2 through 6. In certain examples, the operations of block 1115 may be performed by a power mode manager as described with reference to FIG. 8. At block 1120, the method may include transmitting a speculative PS-Poll over the channel based at least in part on switching to the second power mode. The operations of block 1120 may be performed according to the methods described with reference to FIGS. 2 through 6. In certain examples, the operations of block 1120 may be performed by a PS-Polls manager as described with reference to FIG. 8.

At block 1125, the method may include entering a sleep mode after a downlink transmission opportunity corresponding to the speculative PS-Poll. The operations of block 1125 may be performed according to the methods described with reference to FIGS. 2 through 6. In certain examples, the operations of block 1125 may be performed by a power mode manager as described with reference to FIG. 8.

Figure 12:
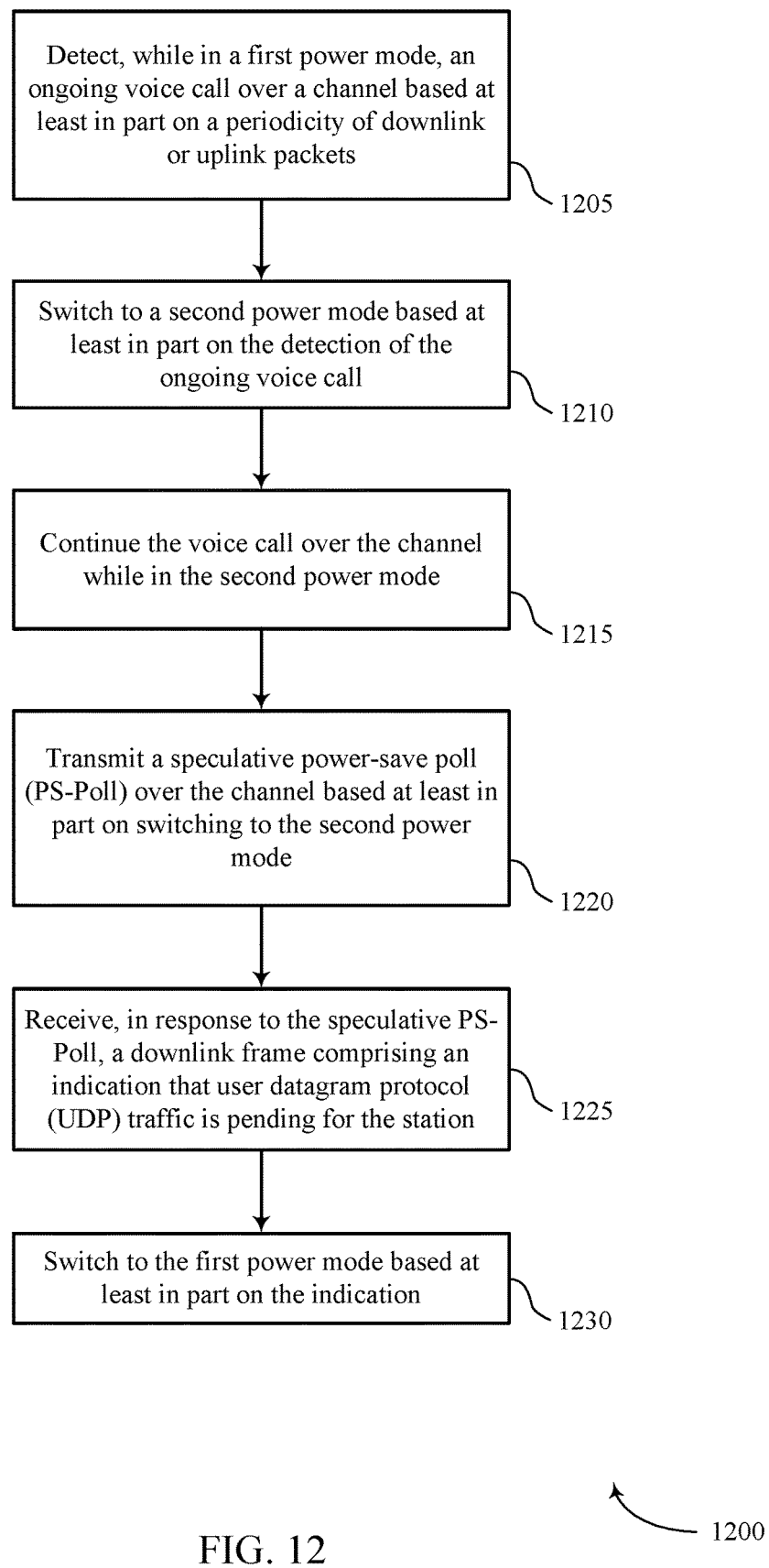

FIG. 12 shows a flowchart illustrating a method 1200 for power management during voice calls in accordance with various aspects of the present disclosure. The operations of method 1200 may be implemented by a wireless device or its components as described herein. For example, the operations of method 1200 may be performed by a power management component as described with reference to FIGS. 7 through 9. In some examples, a wireless device may execute a set of codes to control the functional elements of the device to perform the functions described below. Additionally or alternatively, the wireless device may perform aspects of the functions described below using special-purpose hardware.

At block 1205, the method may include detecting, while in a first power mode, an ongoing voice call over a channel based at least in part on a periodicity of downlink or uplink packets. The operations of block 1205 may be performed according to the methods described with reference to FIGS. 2 through 6. In certain examples, the operations of block 1205 may be performed by a traffic monitoring component as described with reference to FIG. 8. At block 1210, the method may include switching to a second power mode based at least in part on the detection of the ongoing voice call. The operations of block 1210 may be performed according to the methods described with reference to FIGS. 2 through 6. In certain examples, the operations of block 1210 may be performed by a power mode manager as described with reference to FIG. 8.

At block 1215, the method may include continuing the voice call over the channel while in the second power mode. The operations of block 1215 may be performed according to the methods described with reference to FIGS. 2 through 6. In certain examples, the operations of block 1215 may be performed by a power mode manager as described with reference to FIG. 8. At block 1220, the method may include transmitting a speculative PS-Poll over the channel based at least in part on switching to the second power mode. The operations of block 1220 may be performed according to the methods described with reference to FIGS. 2 through 6. In certain examples, the operations of block 1220 may be performed by a PS-Polls manager as described with reference to FIG. 8.

At block 1225, the method may include receiving, in response to the PS-Poll, a downlink frame comprising an indication that UDP traffic is pending for the station. The operations of block 1225 may be performed according to the methods described with reference to FIGS. 2 through 6. In certain examples, the operations of block 1225 may be performed by a traffic monitoring component as described with reference to FIG. 8. At block 1230, the method may include switching to the first power mode based at least in part on the indication. The operations of block 1230 may be performed according to the methods described with reference to FIGS. 2 through 6. In certain examples, the operations of block 1230 may be performed by a power mode manager as described with reference to FIG. 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
    a memory that stores instructions; and
    a processor coupled with the memory, wherein the processor and memory are configured to:
        detect, while in a first power mode, an ongoing voice call over a channel based at least in part on a periodicity of downlink or uplink packets;
        switch to a second power mode based at least in part on the detection of the ongoing voice call; and
        continue the voice call over the channel while in the second power mode.

2. The apparatus of claim 1, wherein the processor and memory are configured to continue the voice call over the channel by being configured to:
    transmit a speculative power-save poll (PS-Poll) over the channel based at least in part on switching to the second power mode.

3. The apparatus of claim 2, wherein the processor and memory are further configured to:
    determine a periodicity of uplink packets associated with the ongoing voice call, wherein the speculative PS-Poll is based at least in part on the periodicity of the uplink packets.

4. The apparatus of claim 2, wherein the speculative PS-Poll is transmitted independent of a downlink beacon traffic indication map (TIM).

5. The apparatus of claim 2, wherein the processor and memory are further configured to:

enter a sleep mode after a downlink transmission opportunity corresponding to the speculative PS-Poll.

6. The apparatus of claim 1, wherein the processor and memory are further configured to:
enter a sleep mode based on a detection that the voice call has ended; and
transition from the sleep mode to the first power mode upon leaving the sleep mode.

7. The apparatus of claim 2, wherein the processor and memory are further configured to:
determine that a predetermined threshold number of consecutive PS-Polls have failed to result in downlink transmissions of data for the apparatus; and
decrease a rate at which speculative PS-Polls are sent based at least in part on the determination.

8. The apparatus of claim 2, wherein the processor and memory are further configured to:
receive, in response to the speculative PS-Poll, a downlink frame comprising an indication that user datagram protocol (UDP) traffic is pending for the apparatus; and
switch to the first power mode based at least in part on the indication.

9. The apparatus of claim 8, wherein the processor and memory are further configured to:
receive the UDP traffic while in the first power mode; and
switch to the second power mode when the channel is free of UDP traffic for a predetermined threshold of time.

10. The apparatus of claim 1, wherein the first power mode prohibits entry into a sleep mode and the second power mode facilitates entry into the sleep mode.

11. The apparatus of claim 1, wherein the apparatus is a wireless communication terminal and further comprises an antenna and a transceiver.

12. A method for wireless communication at a wireless device, comprising:
detecting, while in a first power mode, an ongoing voice call over a channel based at least in part on a periodicity of downlink or uplink packets;
switching to a second power mode based at least in part on the detection of the ongoing voice call; and
continuing the voice call over the channel while in the second power mode.

13. The method of claim 12, wherein continuing the voice call over the channel comprises:
transmitting a speculative power-save poll (PS-Poll) over the channel based at least in part on switching to the second power mode.

14. The method of claim 13, further comprising:
determining a periodicity of uplink packets associated with the ongoing voice call, wherein the speculative PS-Poll is based at least in part on the periodicity of the uplink packets.

15. The method of claim 13, wherein the speculative PS-Poll is transmitted independent of a downlink beacon traffic indication map (TIM).

16. The method of claim 13, further comprising:
entering a sleep mode after a downlink transmission opportunity corresponding to the speculative PS-Poll.

17. The method of claim 12, further comprising:
entering a sleep mode based on a detection that the voice call has ended; and
transitioning from the sleep mode to the first power mode upon leaving the sleep mode.

18. The method of claim 13, further comprising:
determining that a predetermined threshold number of consecutive PS-Polls have failed to result in downlink transmissions of data for the wireless device; and
decreasing a rate at which speculative PS-Polls are sent based at least in part on the determination.

19. The method of claim 13, further comprising:
receiving, in response to the speculative PS-Poll, a downlink frame comprising an indication that user datagram protocol (UDP) traffic is pending for the wireless device; and
switching to the first power mode based at least in part on the indication.

20. The method of claim 19, further comprising:
receiving the UDP traffic while in the first power mode; and
switching to the second power mode when the channel is free of UDP traffic for a predetermined threshold of time.

21. The method of claim 12, wherein the first power mode prohibits entry into a sleep mode and the second power mode facilitates entry into the sleep mode.

22. An apparatus for wireless communications, comprising:
means for detecting, while in a first power mode, an ongoing voice call over a channel based at least in part on a periodicity of downlink or uplink packets;
means for switching to a second power mode based at least in part on the detection of the ongoing voice call; and
means for continuing the voice call over the channel while in the second power mode.

23. The apparatus of claim 22, wherein the means for continuing the voice call over the channel comprises:
means for transmitting a speculative power-save poll (PS-Poll) over the channel based at least in part on switching to the second power mode.

24. The apparatus of claim 23, further comprising:
means for determining a periodicity of uplink packets associated with the ongoing voice call, wherein the speculative PS-Poll is based at least in part on the periodicity of the uplink packets.

25. The apparatus of claim 23, wherein the speculative PS-Poll is transmitted independent of a downlink beacon traffic indication map (TIM).

26. The apparatus of claim 23, wherein the apparatus further comprises:
means for entering a sleep mode after a downlink transmission opportunity corresponding to the speculative PS-Poll.

27. The apparatus of claim 22, further comprising:
means for entering a sleep mode based on a detection that the voice call has ended; and
means for transitioning from the sleep mode to the first power mode upon leaving the sleep mode.

28. The apparatus of claim 23, wherein the apparatus further comprises:
means for determining that a predetermined threshold number of consecutive PS-Polls have failed to result in downlink transmissions of data for the apparatus; and
means for decreasing a rate at which speculative PS-Polls are sent based at least in part on the determination.

29. The apparatus of claim 23, wherein the apparatus further comprises:
means for receiving, in response to the speculative PS-Poll, a downlink frame comprising an indication that user datagram protocol (UDP) traffic is pending for the apparatus; and
means for switching to the first power mode based at least in part on the indication.

30. A non-transitory computer-readable medium storing code for wireless communication, the code comprising instructions executable to:
- detect, while in a first power mode, an ongoing voice call over a channel based at least in part on a periodicity of downlink or uplink packets;
- switch to a second power mode based at least in part on the detection of the ongoing voice call; and
- continue the voice call over the channel while in the second power mode.

* * * * *